US007892086B2

(12) United States Patent
Okada

(10) Patent No.: US 7,892,086 B2
(45) Date of Patent: Feb. 22, 2011

(54) GAMING SYSTEM INCLUDING SLOT MACHINES AND GAMING CONTROL METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1050 days.

(21) Appl. No.: 11/637,127

(22) Filed: Dec. 12, 2006

(65) Prior Publication Data

US 2008/0045297 A1 Feb. 21, 2008

Related U.S. Application Data

(60) Provisional application No. 60/837,617, filed on Aug. 15, 2006.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS

| | | | | |
|---|---|---|---|---|
| 6,634,941 | B2 | 10/2003 | Olive | |
| 7,275,988 | B2 * | 10/2007 | Aida et al. | 463/20 |
| 2003/0130028 | A1 * | 7/2003 | Aida et al. | 463/20 |
| 2004/0110558 | A1 | 6/2004 | Suda et al. | |
| 2005/0049032 | A1 | 3/2005 | Kobayashi | |
| 2006/0094507 | A1 * | 5/2006 | Iwamoto | 463/42 |
| 2006/0148557 | A1 | 7/2006 | Okada | |
| 2006/0172800 | A1 | 8/2006 | Kogo | |
| 2008/0039177 | A1 | 2/2008 | Okada | |
| 2008/0045309 | A1 | 2/2008 | Okada | |
| 2008/0045315 | A1 * | 2/2008 | Kojima | 463/20 |
| 2008/0045316 | A1 * | 2/2008 | Kojima | 463/20 |
| 2008/0051175 | A1 | 2/2008 | Okada | |
| 2008/0064468 | A1 | 3/2008 | Okada | |
| 2009/0227350 | A1 * | 9/2009 | Inamura | 463/20 |
| 2009/0227353 | A1 * | 9/2009 | Yoshizawa | 463/20 |
| 2009/0312091 | A1 * | 12/2009 | Kato et al. | 463/25 |

FOREIGN PATENT DOCUMENTS

| | | | |
|---|---|---|---|
| CN | 1589941 | A | 3/2005 |
| CN | 1785464 | A | 6/2006 |
| CN | 1810340 | A | 8/2006 |
| JP | 2005-73821 | A | 3/2005 |
| JP | 2006-158875 | A | 6/2006 |
| JP | 2006-231038 | A1 | 9/2006 |

* cited by examiner

*Primary Examiner*—Ronald Laneau
(74) *Attorney, Agent, or Firm*—NDQ&M Watchstone LLP

(57) ABSTRACT

A gaming system comprises: multiple slot machines each of which provides a basic game of a kind that differs from those of the other slot machines; and a second gaming device which is a separate device from the multiple slot machines, and which provides a roulette game. The gaming system further comprises a central controller. With such an arrangement, in the case that a "BONUS" symbol combination has come to a stop along an active pay line in a basic game at any one of the slot machines, the central controller receives a second game start signal from this slot machine. Also, the central controller receives payout data for the basic game from the multiple slot machines at a predetermined timing, and determines a payout for the second game based upon the payout data.

14 Claims, 23 Drawing Sheets

FIG. 14

BASIC GAME RANDOM TABLE
(MACHINE NAME: SLOT MACHINE 13A,
RANGE OF RANDOM NUMBER: 0~65535)

| COMBINATION | RANGE OF RANDOM NUMBER | DETERMINATION PROBABILITY |
|---|---|---|
| A | 0~499 | 500/65536 |
| K | 500~1499 | 1000/65536 |
| Q | 1500~2999 | 1500/65536 |
| J | 3000~4999 | 2000/65536 |
| 10 | 5000~7999 | 3000/65536 |
| BONUS | 8000~(a-1) | (b)/65536 |
| OTHER | (a)~65535 | (c)/65536 |

FIG. 15

BASIC GAME SWITCHING PROBABILITY DETERMINING TABLE

| PATTERN | PAYOUT AMOUNT / INSERTED AMOUNT | SLOT MACHINE 13A | | | ··· |
|---|---|---|---|---|---|
| | | a | b | c | ··· |
| 1 | LESS THAN 0.8 | 10000 | 2000 | 55536 | ··· |
| 2 | 0.8 OR MORE AND LESS THAN 1.2 | 9000 | 1000 | 56536 | ··· |
| 3 | 1.2 OR MORE | 8500 | 500 | 57036 | ··· |

FIG. 16

BASIC GAME PAYOUT TABLE (MACHINE NAME: SLOT MACHINE 13A)

| COMBINATION | PAYOUT AMOUNT | | |
|---|---|---|---|
| | CREDIT AMOUNT 1 | CREDIT AMOUNT 2 | CREDIT AMOUNT 3 |
| A | 20COINS | 40COINS | 60COINS |
| K | 10COINS | 20COINS | 30COINS |
| Q | 5COINS | 10COINS | 15COINS |
| J | 2COINS | 4COINS | 6COINS |
| 10 | 1COIN | 2COINS | 3COINS |
| BONUS | ONE HUNDRED COINS | TWO HUNDRED COINS | THREE HUNDRED COINS |

FIG. 17

SECOND GAME PAYOUT TABLE

| BETTING METHOD | FACTOR | SLOT MACHINE | | |
|---|---|---|---|---|
| | | CREDIT AMOUNT 1 | CREDIT AMOUNT 2 | CREDIT AMOUNT 3 |
| STRAIGHT BET | ×36 | ○ | | |
| SPLIT BET | ×18 | ○ | | |
| STREET BET | ×12 | ○ | | |
| CORNER BET | ×9 | | ○ | |
| FIVE BET<br>LINE BET | ×6 | | ○ | ○ |
| DOZEN BET<br>COLUMN BET | ×3 | | ○ | ○ |
| RED/BLACK<br>EVEN/ODD<br>LOW/HIGH | ×2 | | | ○ |

FIG. 18

SECOND GAME PAYOUT DETERMINING TABLE

| PATTERN | PAYOUT AMOUNT / INSERTED AMOUNT | WEIGHTING FACTOR |
|---|---|---|
| 1 | LESS THAN 0.8 | ×1.5 |
| 2 | 0.8 OR MORE AND LESS THAN 1.2 | ×1.0 |
| 3 | 1.2 OR MORE | ×0.5 |

GAMING SYSTEM INCLUDING SLOT MACHINES AND GAMING CONTROL METHOD THEREOF

BACKGROUND OF THE INVENTION

1. Field of the Invention

The present invention relates to a gaming system including slot machines and a gaming control method.

2. Related Art

Examples of known conventional slot machines include a slot machine having a function of providing a free game or a bonus game that provides the player with an advantage in comparison with a basic game as disclosed in the specification of U.S. Pat. No. 6,634,941 and the specification of U.S. Patent Application Publication No. 2004/110558. The term "free game" or "bonus game" as used here represents a second game. Examples of such second games executed by such slot machines thus disclosed include: a game which, when a particular symbol is displayed, raises the probability of winning a particular combination that gives the player an award; and a game that raises the amount of payout to be received by a player who has won a particular winning combination.

Also, examples of other disclosed slot machines include a slot machine that displays the value of the payout which the player has a chance to get in the second game, so as to notify the player before the second game.

With such conventional slot machines, the same slot machine also provides the second game. The present invention provides a slot machine that offers further novel entertainment.

SUMMARY OF THE INVENTION

The first aspect of the present invention relates to a gaming system having the following configuration. The gaming system comprises multiple slot machines and a second gaming device for executing a second game, each of which has a function of communicating with a central controller. The multiple slot machines each provide a basic game of a kind that differs from those provided by the other slot machines. Furthermore, each of the multiple slot machines has a function whereby, in the case that a predetermined condition has been satisfied, a signal is transmitted for switching the game to the second game. The second gaming device is a separate device from the multiple slot machines, and provides the second game. On the other hand, the central controller has a function of receiving payout data for the basic game from the multiple slot machines at a predetermined timing, and a function of determining a payout for the second game based upon the payout data.

With the gaming system according to the first aspect of the present invention, the multiple slot machines each provide a basic game of a kind that differs from those provided by the other slot machines. Furthermore, in the case that a predetermined condition has been satisfied, the second gaming device executes the second game. The central controller receives the payout data for the basic game from the multiple slot machines at a predetermined timing. Then, the central controller determines the payout for the second game based upon the payout data thus received.

The second aspect of the present invention relates to a gaming system having the following configuration. The central controller receives the payout data for the basic game from the multiple slot machines at a predetermined timing. Then, the central controller determines the probability of the game being switched to the second game based upon the payout data, and transmits data including the probability thus determined to the multiple slot machines.

With the gaming system according to the second aspect of the present invention, the central controller receives the payout data for the basic game from the multiple slot machines at a predetermined timing. Then, the central controller determines the probability of the basic game being switched to the second game based upon the payout data thus received. The data including the probability thus determined is transmitted to each of the multiple slot machines. Each of the multiple slot machines stores the data thus transmitted.

The third aspect of the present invention relates to a gaming system having the following configuration. In the case that a predetermined condition has been satisfied for switching the game to the second game at any one of the slot machines, the central controller executes the second game using the credit data provided from the basic game.

With the gaming system according to the third aspect of the present invention, the credit data provided upon a predetermined condition being satisfied for switching the game to the second game at any one of the slot machines is used as the credit data required for executing the second game.

The fourth aspect of the present invention relates to a gaming system having the following configuration. In the case that a predetermined condition has been satisfied for switching the game to the second game at any one of the slot machines, the central controller determines the payout for the second game based upon the amount of credits used in the basic game.

With the gaming system according to the fourth aspect of the present invention, the payout for the second game is determined based upon the amount of credits that have been used in the basic game at the slot machine that has satisfied a predetermined condition for switching the game to the second game.

BRIEF DESCRIPTION OF THE DRAWINGS

FIG. 14 is a diagram which shows a structure of a random number table for a basic game;

FIG. 15 is a diagram which shows a structure of a basic game switching probability determining table;

FIG. 16 is a diagram which shows a structure of a payout table for the basic game;

FIG. 17 is a diagram which shows a structure of a second game payout table;

FIG. 18 is a diagram which shows a structure of a second game payout determining table;

DETAILED DESCRIPTION OF THE INVENTION

Figure 2:
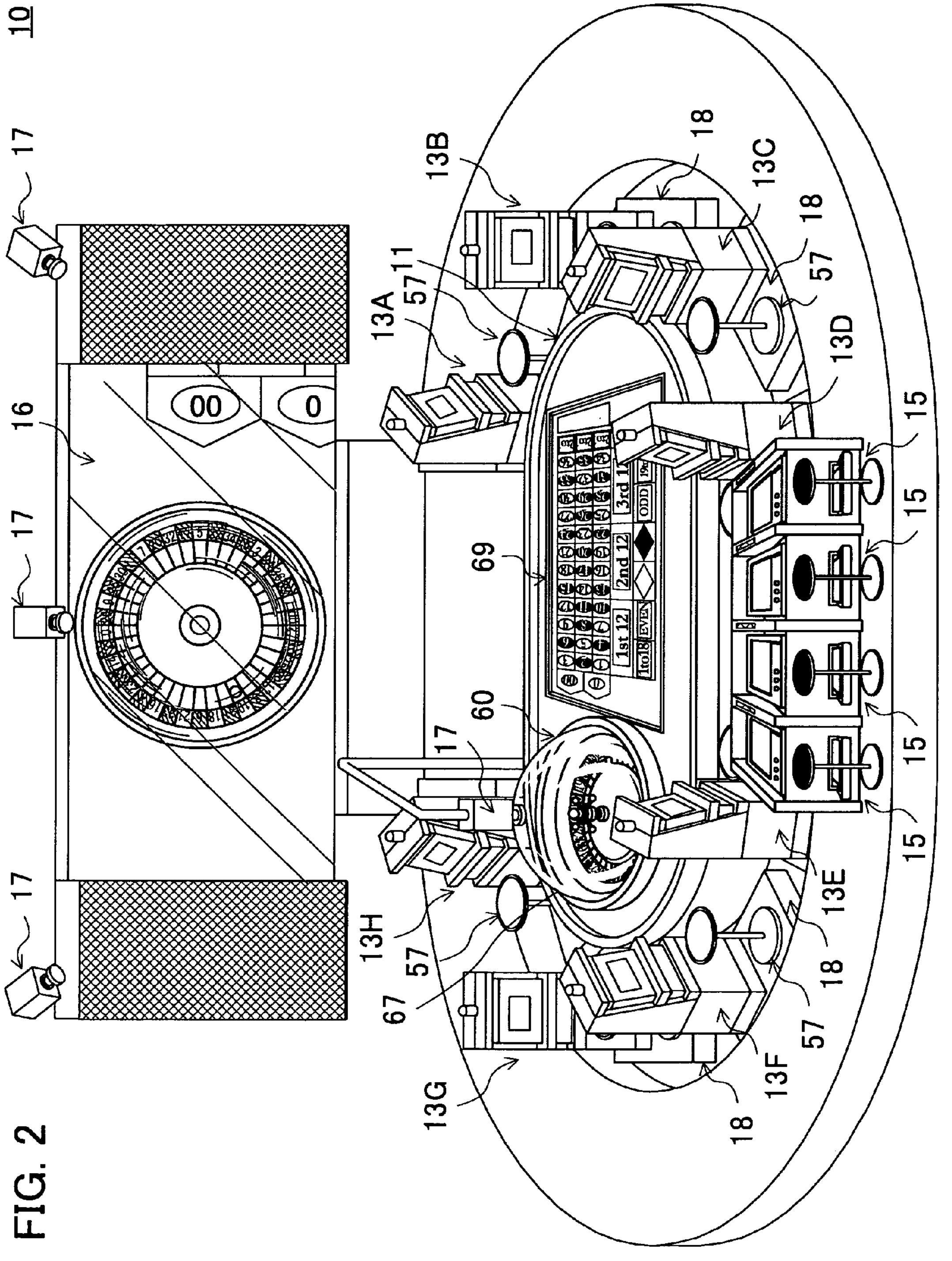
FIG. 2 is a schematic diagram which shows an external view of the gaming system according to the embodiment of the present invention.

A description will be given regarding the schematic configuration of the gaming system 10 according to the present embodiment with reference to FIGS. 2 and 21. FIG. 2 is a perspective view which shows an external configuration of the gaming system 10 according to the present embodiment. As shown in FIG. 2, the gaming system 10 principally comprises slot machines 13A, 13B, . . . , and 13H, a second gaming device 11, and second gaming terminals 15. The term "second gaming device 11" as used here represents a gaming device for a roulette game, for example. Each of the slot machines 13A, 13B, . . . , and 13H has a function of allowing the player to bet on a roulette game in the second game under a predetermined condition described later with reference to FIGS. 20A through 20D, in addition to the basic game described later with reference to FIG. 19.

Furthermore, the gaming system 10 includes a large-size monitor 16. The large-size monitor 16 displays the progress of the second game (which will also be referred to as "roulette game" hereafter). The multiple slot machines 13A, 13B, . . . , 13H (eight slot machines in the present embodiment) are provided such that they surround the perimeter of the second gaming device 11 in a layout that allows the players at the slot machines 13A, 13B, . . . , and 13H to see the large-size monitor 16. The slot machines 13A, 13B, . . . , and 13H are configured such that they provide various kinds of basic games that differ from one another. Examples of such various configurations of the slot machines 13A, 13B, . . . , and 13H include: a configuration having three reels; a configuration having five reels; etc. With such an arrangement, each of the slot machines 13A, 13B, . . . , and 13H, including a seat 57 for the player, is installed on a movable floor 18. Furthermore, such an arrangement has a mechanism for raising a slot machine that has entered the second game mode, e.g., the slot machine 13A together with its seat 57 in the form of a single unit by raising the movable floor 18 in the event that the second game has started.

Furthermore, the gaming system 10 includes multiple second gaming terminals 15 (four second gaming terminals in the present embodiment) in a layout that allows the players to see the large-size monitor 16 in front of them. Each of the second gaming terminals 15 is a dedicated roulette gaming terminal, and is a terminal which allows other players to participate in the second game in the case that the second game has started at any one of the slot machines, e.g., the slot machines 13A.

Furthermore, the gaming system 10 includes multiple movable viewpoint cameras 17 (four in the present embodiment). One of the movable viewpoint cameras 17 is provided for capturing an image of a roulette device 60 described later with reference to FIG. 12. The movable viewpoint camera 17 is provided at a position that allows it to capture an image of the roulette device 60 from a viewpoint along the vertical direction from the upper side to the lower side of the roulette device 60. The movable viewpoint camera 17 thus provided captures an image of the rotating roulette wheel, and an image of a ball 65 at a certain position after the roulette wheel stops. The gaming system 10 is installed in an amusement facility such as a casino.

With the slot machines 13A, 13B, . . . , and 13H configured such that each slot machine provides a different kind of basic game, in the case that a predetermined condition has been satisfied, the game is switched to the second game. Here, the condition for switching the game to the second game is changed by a central controller 14 for controlling the gaming system 10. Specifically, the central controller 14 receives payout data of the slot machines 13A, 13B, . . . , and 13H (Step S403 in FIG. 21) at predetermined time intervals (Step S401 in FIG. 21). The central controller 14 determines the probability of the game being switched to the second game for each of the slot machines 13A, 13B, . . . , and 13H, and the values of a table for determining the payout in the second game, based upon the data thus received (step S406 shown in FIG. 21).

Figure 1:
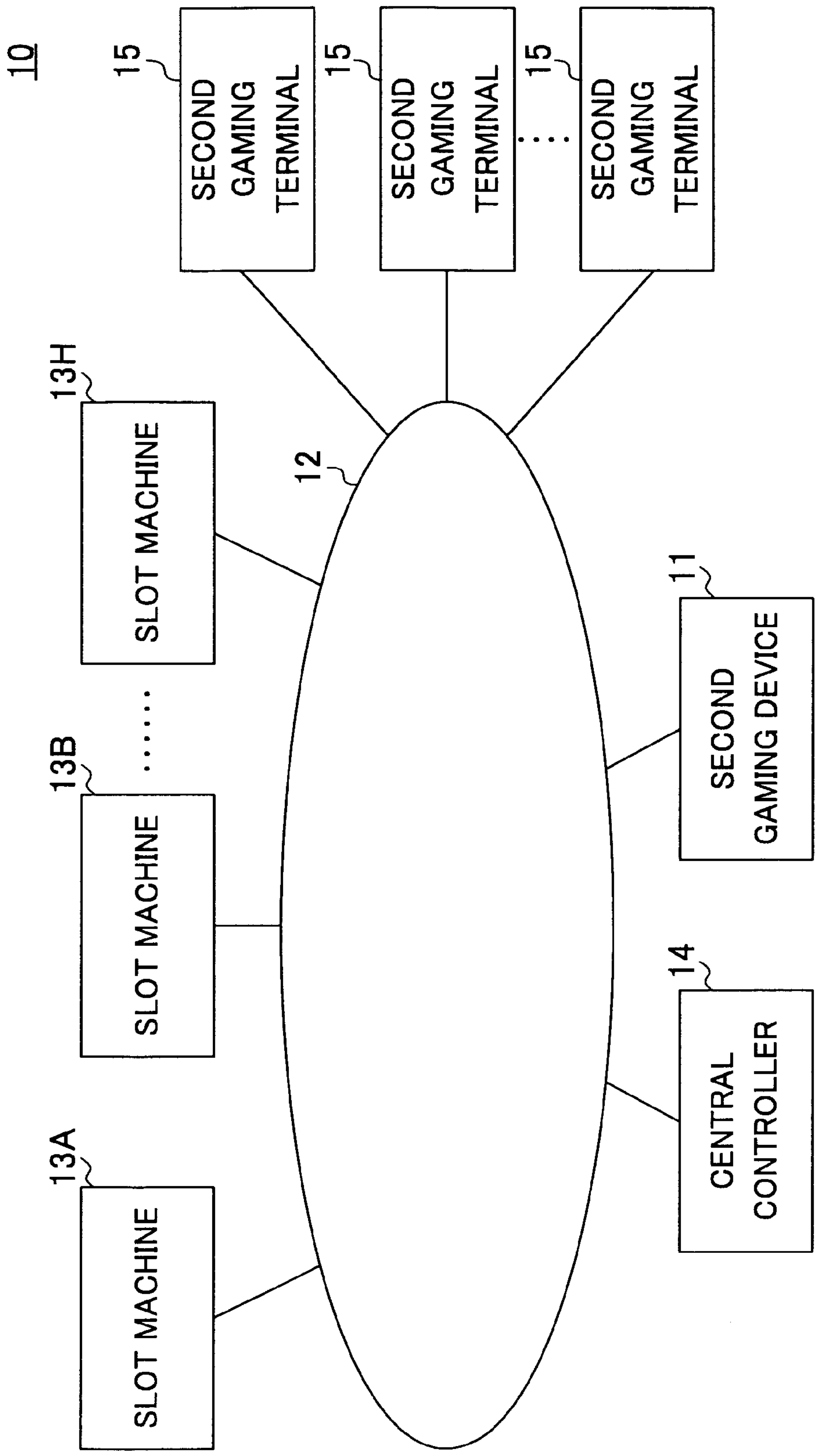
FIG. 1 is a system configuration diagram which shows a gaming system according to an embodiment of the present invention.

A description will be made below regarding the configuration of the gaming system 10 according to the present invention with reference to FIG. 1. With the gaming system 10 shown in FIG. 1, the components connected to the network 12 include: the slot machines 13A, 13B, . . . , and 13H; the second gaming device 11; a central controller 14; and the second gaming terminals 15. The central controller 14 can control each of the slot machines 13A, 13B, . . . , and 13H, the second gaming device 11, and each second gaming terminal 15 via the aforementioned network 12.

Each of the slot machines 13A, 13B, . . . , and 13H provides a function of allowing the player to play a basic game. Here, the slot machines 13A, 13B, . . . , and 13H provide respective kinds of basic games that differ from one another. Furthermore, each of the slot machines 13A, 13B, . . . , and 13H has a function whereby, in the case that a predetermined condition has been satisfied, a signal is transmitted for switching the game from the basic game to the second game. Here, the second game is executed by the second gaming device 11 under the control of the central controller 14. In this case, each of the slot machines 13A, 13B, . . . , and 13H played by the players serves as a terminal for the second game, which allows the player to bet on a roulette game. Such an arrangement allows the player to play the second game using the second gaming device 11 which is a separate unit from the slot machines 13A, 13B, . . . , and 13H.

Furthermore, the second gaming terminal 15 is connected to the central controller 14 via the network 12. The gaming system 10 has a mechanism which allows other players to play the second game via the aforementioned second gaming terminals 15, in addition to the slot machines 13A, 13B, . . . , and 13H in the case that the roulette game has started at the second gaming device 11. That is to say, with such an arrangement, in the case that the roulette game has started, other players in the amusement facility can also participate in the roulette game using the second gaming terminals 15.

Figure 3:
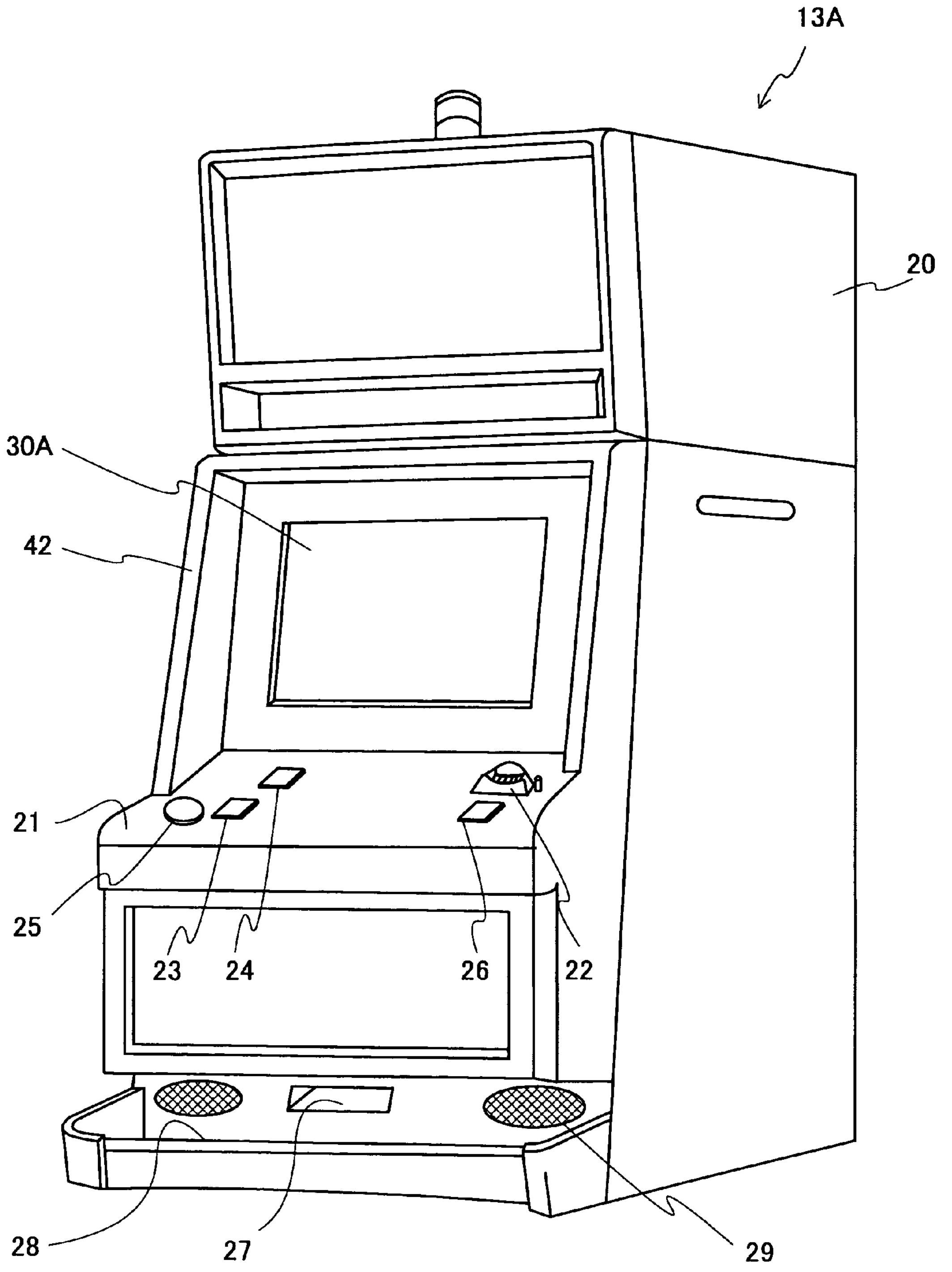
FIG. 3 is a perspective view which shows a slot machine according to the embodiment of the present invention.

FIG. 3 is a perspective view which shows one of the slot machines 13A, 13B, . . . , and 13H according to an embodiment of the present invention. The slot machine 13A includes a cabinet 20 and a main door 42. The cabinet 20 has a structure in which the face facing the player is open. The cabinet 20 includes various kinds of components. Such components include: a controller 100 (see FIG. 5 and FIG. 8) for electrically controlling the slot machine 13A; a hopper 44 for controlling the insertion of coins (gaming medium) and for retaining and paying out the coins (see FIG. 5 and FIG. 8); etc. The gaming medium is not restricted to coins. Other examples of such gaming media include medals, tokens, electronic money or electronic value information (credit) having the same value.

The main door 42 is a member that serves as a cover of the cabinet 20, which protects the internal components stored in the cabinet 20 from being exposed to the outside. The main door 42 includes the liquid crystal display 30A at approximately the center thereof.

The liquid crystal display 30A is provided for displaying various kinds of images with respect to the game such as images for providing visual effects. Such an arrangement allows the player to advance the game while visually confirming various kinds of images displayed on the aforementioned liquid crystal display 30A. In particular, in the roulette game, the liquid crystal display 30A displays the BET screen 70 described later with reference to FIG. 24. The liquid crystal display 30A includes a transparent liquid crystal panel 34 (see FIGS. 6 and 7). The transparent liquid crystal panel 34 has a function of switching a part of or the entire area of the liquid crystal panel 34 between a transparent mode and an opaque mode, and a function of displaying various kinds of images. Note that a detailed description will be given regarding the configuration of the liquid crystal display 30A.

Let us consider an arrangement in which the slot machine 13A comprises video reels. With such an arrangement, five virtual reels are displayed on the liquid crystal display 30A. Note that the term "video reel" as used here represents a mechanism for displaying a reel on the liquid crystal display 30A in the form of an image, instead of the mechanical reels. Multiple kinds of symbols necessary for the basic game include "BONUS", "WILD", "TREASURE BOX", "GOLDEN MASK", "HOLY CUP", "COMPASS & MAP", "SNAKE", "A", "K", "Q", "J", and "10". With such an arrangement, the liquid crystal display 30A displays these symbols with an image as if the reel has rotated.

On the other hand, let us consider an arrangement in which the slot machine 13A comprises mechanical reels. With such an arrangement, the slot machine 13A includes five mechanical reels 3A, 3B, 3C, 3D, and 3E (see FIGS. 4 and 6), each of which has multiple kinds of symbols depicted on the outer face thereof, arranged along a horizontal line on the rear face side of the liquid crystal display 30A in a manner that allows each mechanical reel to be rotated. The mechanical reels 3A through 3E and stepping motors 45A, 45B, 45C, 45D, and 45E (see FIG. 8) described later, etc., form a mechanism for displaying multiple symbols. As described above, each of the mechanical reels 3A through 3E has symbols, which are necessary for the basic game, depicted on the outer face thereof. In the case that the transparent liquid crystal panel 34 is in the transparent mode, the player can visually confirm these various kinds of symbols on the mechanical reels 3A through 3E.

The slot machine 13A includes an approximately horizontal operation unit 21 below the liquid crystal display 30A. Furthermore, a coin insertion opening 22 is provided on the right side of the operation unit 21, which allows the player to insert coins. On the other hand, the components provided at the left side of the operation unit 21 include: a BET switch 23 which allows the player to determine which lines are to be set to active pay lines among nine lines L1, L2, L3, L4, L5, L6, L7, L8, and L9, for providing an award described later (which will simply be referred to as "active pay lines" hereafter), and which allows the player to select the number of coins as gaming media which are to be bet on the aforementioned active pay lines; a spin repeat bet switch 24 which allows the player to play the game again without changing the number of coins bet on the aforementioned active pay lines from that in the immediately prior game. Such an arrangement allows the player to set the number of coins bet on the aforementioned active pay lines by performing a pushing operation on either the BET switch 23 or the spin repeat bet switch 24.

With the aforementioned operation unit 21, a start switch 25 is provided on the left side of the BET switch 23, which allows the player to input a start operation instruction for the basic game in increments of games. Upon performing a pushing operation on either the start switch 25 or the spin repeat bet switch 24, which serves as a trigger to start the game, the aforementioned five mechanical reels 3A through 3E start to rotate.

A cash out switch 26 is provided near the coin insertion opening 22 on the aforementioned operation unit 21. Upon the player pushing the cash out switch 26, the inserted coins are paid out from a coin payout opening 27 provided at a lower portion of the front face of the main door 42. The coins thus paid out are retained in a coin tray 28. Furthermore, the coin payout opening 27 is provided on the upper side of the coin tray 28, with sound transmission openings 29 provided to the left and right of the coin payout opening 27. Here, the sound transmission openings 29 are provided for transmitting sound effects generated by a speaker 41 (see FIGS. 5 and 8) stored within the cabinet 20.

Figure 4:
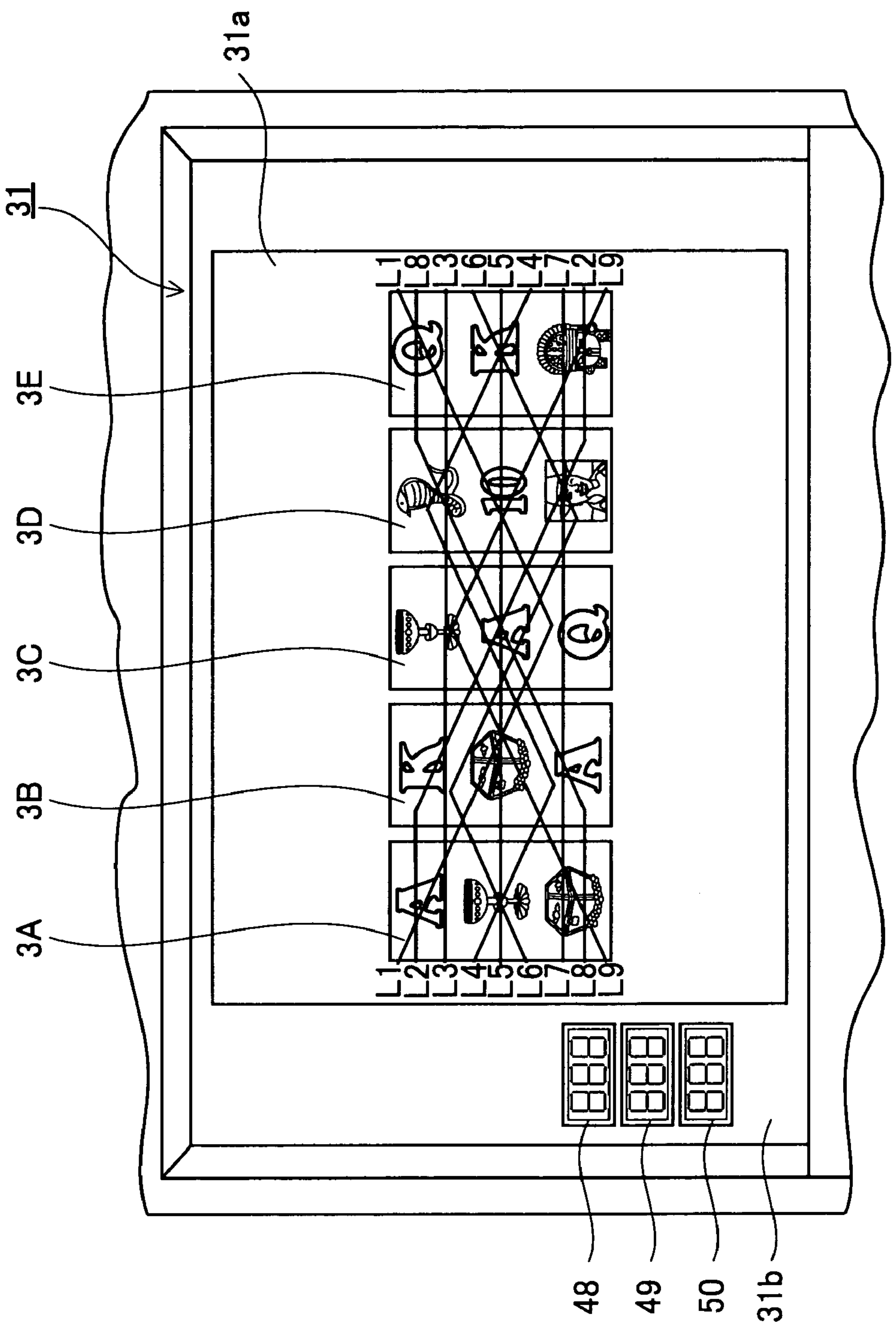
FIG. 4 is an enlarged front view which shows an enlarged view of the display region of the slot machine according to the embodiment of the present invention.

FIG. 4 is an enlarged view which shows the display region of the slot machine 13A. The liquid crystal display 30A of the slot machine 13A includes a front panel 31 and the transparent liquid crystal panel 34 (see FIGS. 6 and 7) provided at the rear face of the front panel 31. The front panel 31 comprises a transparent display screen 31*a* and a design formation area 31*b* where designs are formed. Such an arrangement allows the player to visually confirm the image information displayed on the transparent liquid crystal panel 34 provided to the rear face of the front panel 31 through the display screen 31*a* of the front face 31. On the other hand, let us consider the case in which the region of the aforementioned transparent liquid crystal panel 34 is in the transparent mode. In this case, such an arrangement allows each of the symbols on the five mechanical reels 3A through 3E provided on the rear side of the transparent liquid crystal panel 34 to be visually confirmed through the display screen 31*a*. We will now consider an arrangement in which the slot machine 13A comprises video reels. With such an arrangement, the transparent liquid crystal panel 34 in an opaque state may display the reels in the form of an image. Also, an ordinary liquid crystal panel may be employed instead of the transparent liquid crystal panel 34.

Furthermore, various kinds of display units, i.e., a payout display unit 48, a credit amount display unit 49, and a BET amount display unit 50, are provided on the left side of the rear face the liquid crystal display 30A. Note that the design formation area 31*b* of the front panel 31 is formed having a transparent portion that covers the top faces of these display units 48 through 50, thereby allowing the player to visually confirm the contents displayed on the aforementioned display units 48 through 50.

The slot machine 13A has nine lines L1 through L9 for providing awards as shown in FIG. 4. Each of the lines L1 through L9 for providing awards is formed such that it extends so as to pass through one of the symbols for each of the mechanical reels 3A through 3E when the rotation of all the five reels 3A through 3E has stopped, or when the five video reels have stopped.

Upon pushing the aforementioned BET switch 23 once, the line L3 for providing a third award, the line L5 for providing a fifth award, and the line L7 for providing a seventh award, are set to be active pay lines, and one coin is input as a credit medal, for example.

Furthermore, upon pushing the aforementioned BET switch 23 twice, the line L1 for providing a first award, the line L4 for providing a fourth award, and the line L8 for providing an eighth award, are set to be active pay lines, in addition to the aforementioned three lines, and two coins are input as credit medals, for example.

Furthermore, upon pushing the aforementioned BET switch 23 three times, the line L2 for providing a second award, the line L6 for providing a sixth award, and the line L9 for providing a ninth award, are set to be active pay lines, in addition to the aforementioned six lines, and three coins are input as credit medals, for example.

The game available in the present embodiment is a basic game in which a predetermined set of symbols are made along the active pay lines. In the case that a predetermined condition has been satisfied in the basic game, the game is switched to the second game with coins paid out in the basic game according to a predetermined condition.

The payout display unit 48 is a component for displaying the amount of the coins paid out when a particular combination of the symbols has been displayed along any one the active pay lines for providing an award. The credit amount display unit 49 is a component for displaying the amount of the coins retained in the slot machine 13A in the form of a credit. The BET amount display unit 50 is a component for displaying the BET amount which is the number of coins bet on the aforementioned active pay lines. Each of the display units 48 through 50 comprises a segment display device. Alternatively, each of the display units 48 through 50 may be displayed on the transparent liquid crystal panel 34 in the form of an image.

Figure 5:
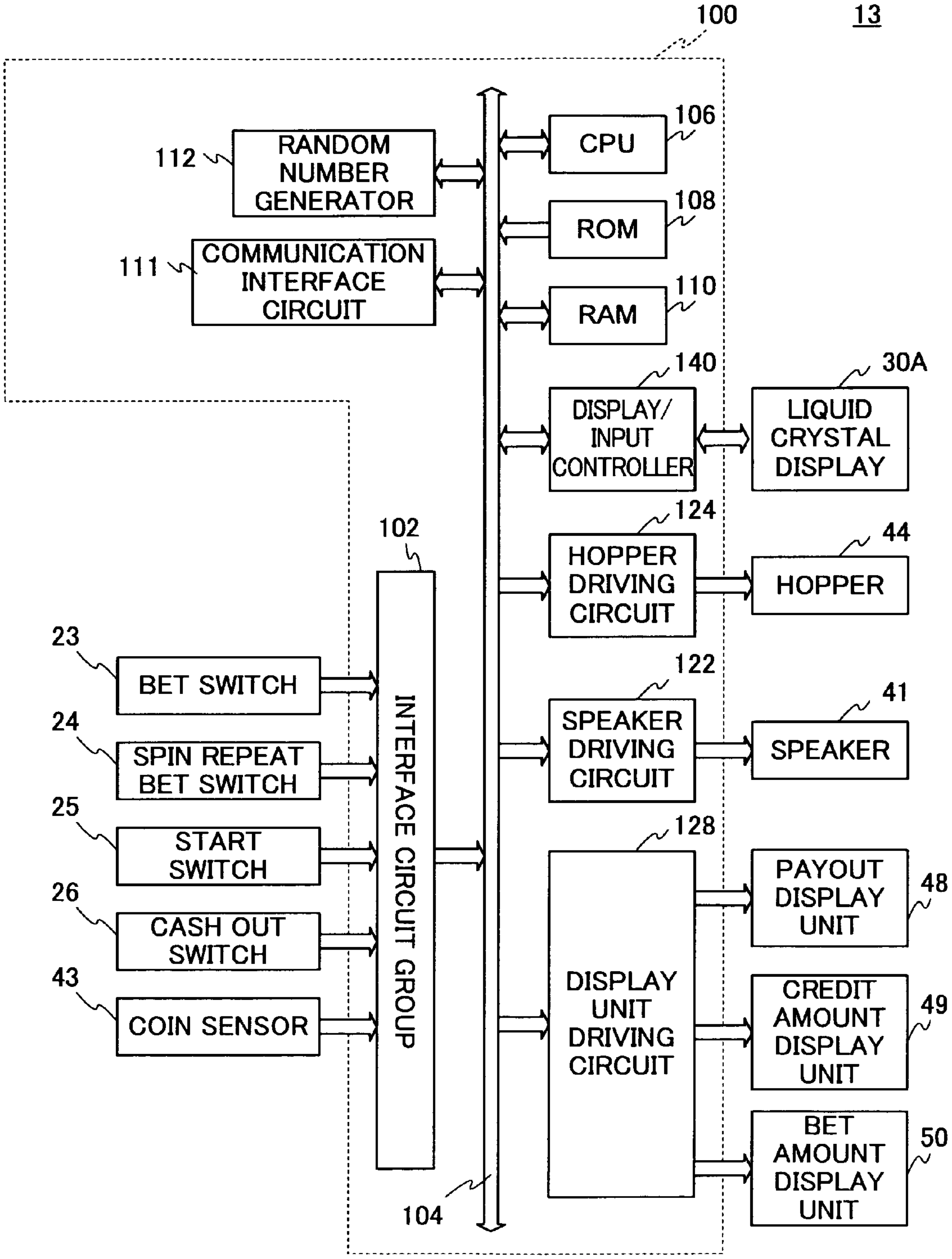
FIG. 5 is a block diagram which shows an electrical configuration of a controller of a video reel slot machine according to the embodiment of the present invention.

FIG. 5 is a block diagram which shows an electrical configuration of a controller 100 of the slot machine 13A including the video reels. Note that a description will be given later regarding the slot machine 13A including the mechanical reels with reference to FIG. 8. As shown in FIG. 5, the controller 100 of the slot machine 13A is a micro computer, and includes an interface circuit group 102, an input/output bus 104, a CPU 106, ROM 108, RAM 110, a communication interface circuit 111, a random number generator 112, a speaker driving circuit 122, a hopper driving circuit 124, a display unit driving circuit 128, and a display/input controller 140.

The interface circuit group 102 is connected to the input/output bus 104. The input/output bus 104 performs input/output of data signals or address signals to/from the CPU 106.

Furthermore, the start switch 25 is connected to the interface circuit group 102. The start signal output from the start switch 25 is converted into a predetermined signal by the interface circuit group 102, and the input signal thus converted is supplied to the input/output bus 104.

Furthermore, the BET switch 23, the spin repeat bet switch 24, and the cash out switch 26 are connected to the interface circuit group 102. Each of the switching signals output from these switches 23, 24, and 26 is also supplied to the interface circuit group 102, and is converted into a predetermined signal by the interface circuit group 102. The switching signals thus converted are supplied to the input/output bus 104.

Furthermore, a coin sensor 43 is connected to the interface circuit group 102. The coin sensor 43 is a sensor for detecting the coin inserted into the coin insertion opening 22. The coin sensor 43 is provided in combination with the coin insertion opening 22. The sensing signal output from the coin sensor 43 is also supplied to the interface circuit group 102, and is converted into a predetermined signal by the interface circuit group 102. The sensing signal thus converted is supplied to the input/output bus 104.

The ROM 108 and the RAM 110 are connected to the input/output bus 104.

Upon reception of the basic game start operation instruction input through the start switch 25, which serves as a trigger, the CPU 106 reads out a basic game program, and executes the basic game. The basic game program has been programmed so as to instruct the CPU 106 to perform the following operation. That is to say, according to the basic game program, the CPU 106 displays an image of the five video reels commencing to scroll the symbols on the five video reels on the liquid crystal display 30A via the display/input controller 140. Then, the CPU 106 displays an image of the five video reels stopping such that the combination of the symbols on these five video reels is rearranged, whereupon a new combination of the symbols is made along the active pay lines. In the case that a particular combination of the symbols for providing an award has been made along any one of the active pay lines when they are stationary, the CPU 106 pays out a predetermined amount of coins corresponding to the particular combination for providing the award.

Furthermore, the CPU 106 controls the second game. With such an arrangement, in the case that a predetermined condition has been satisfied after the five video reels have been stopped, the CPU 106 transmits a signal for executing the second game.

The ROM 108 stores: a control program for central control of the slot machine 13A; a program for executing a routine shown in FIG. 19 and FIGS. 20A through 20D (which will be referred to as the "routine execution program" hereafter); initial data for executing the control program; and various data tables used for determination processing. Note that the routine execution program includes the aforementioned basic game program etc. Examples of the data tables include tables such as those shown in FIGS. 14 and 16. The RAM 110 temporarily stores flags, variables, etc., used for the aforementioned control program.

Furthermore, a communication interface circuit 111 is connected to the input/output bus 104. The communication interface circuit 111 is a circuit for communicating with the central controller 14 etc., via the network 12 including various kinds of networks such as a LAN. With the present embodiment, in the case that a predetermined condition has been satisfied in the basic game, the CPU 106 switches the game to the second game. In this case, the CPU 106 transmits the second game start signal to the central controller 14 etc., via the communication interface circuit 111. Furthermore, the CPU 106 receives data necessary for displaying the BET screen 70 from the central controller 14 via the communication interface circuit 111, and displays the image thus received on the liquid crystal display 30A as the image of the BET screen 70. Subsequently, with the liquid crystal display 30A, the slot machine 13A serves as a terminal which allows the player to place a bet on the second game.

Furthermore, the random number generator 112 for generating a random number is connected to the input/output bus 104. The random number generator 112 generates a random number in a predetermined range, e.g., a range between 1 and 65535 ($2^{16}-1$). Alternatively, an arrangement may be made in which the CPU 106 generates a random number by computation.

Furthermore, the display unit driving circuit 128 for driving each of the aforementioned display units 48 through 50 is connected to the input/output bus 104. The CPU 106 controls the operation of each of the aforementioned display units 48 through 50 via the display unit driving circuit 128 according to the occurrence of a predetermined event.

Furthermore, the speaker driving circuit 122 for driving the speaker 41 is connected to the input/output bus 104. The CPU 104 reads out the sound data stored in the ROM 108, and transmits the sound data thus read out to the speaker driving circuit 122 via the input/output bus 104, thereby providing sound effects generated by the speaker 41.

Furthermore, the hopper driving circuit 124 for driving the hopper 44 is connected to the input/output bus 104. Upon reception of a cash out signal input from the cash out switch 26, the CPU 106 transmits a driving signal to the hopper driving circuit 124 via the input/output bus 104. As a result, the hopper 44 pays out an amount of coins corresponding to the credit remaining at the current point in time, as stored in a predetermined memory area of the RAM 110.

Furthermore, the display/input controller 140 is connected to the input/output controller 140. The CPU 106 creates an image display command corresponding to the state and results of the game, and outputs the image display command thus created to the display/input controller 140 via the input/output bus 104. Upon reception of the image display command input from the CPU 106, the display/input controller 140 creates a driving signal for driving the liquid crystal display 30A according to the image display command thus input, and outputs the driving signal thus created to the liquid crystal display 30A. As a result, a predetermined image is displayed on the transparent liquid crystal panel 34 of the liquid crystal display 30A. The display/input controller 140 transmits the signal input through the touch panel 32 provided on the liquid crystal display 30A to the CPU 106 via the input/output bus 104 in the form of an input signal.

Figure 6:
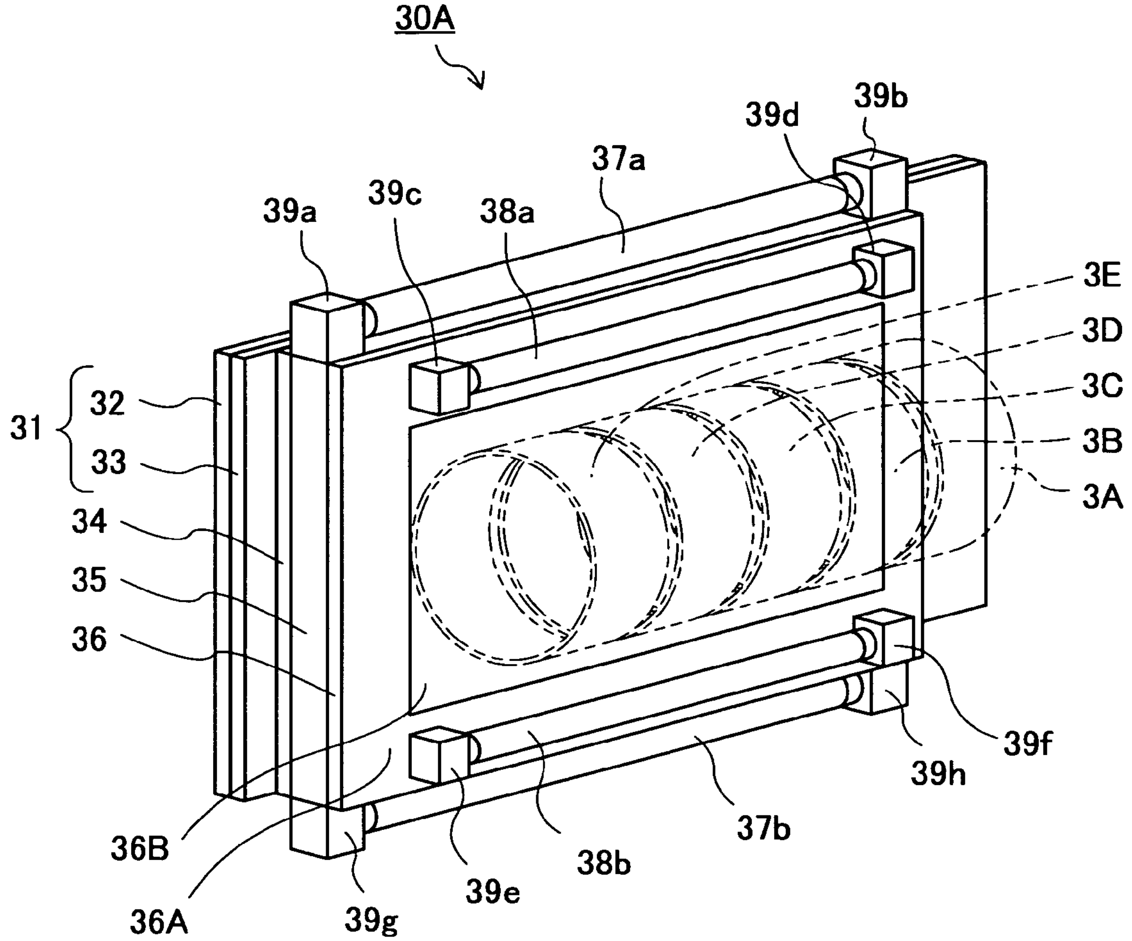
FIG. 6 is a perspective view which shows a schematic configuration of a liquid crystal display of the slot machine according to the embodiment of the present invention as viewed from the rear side.
Figure 7:
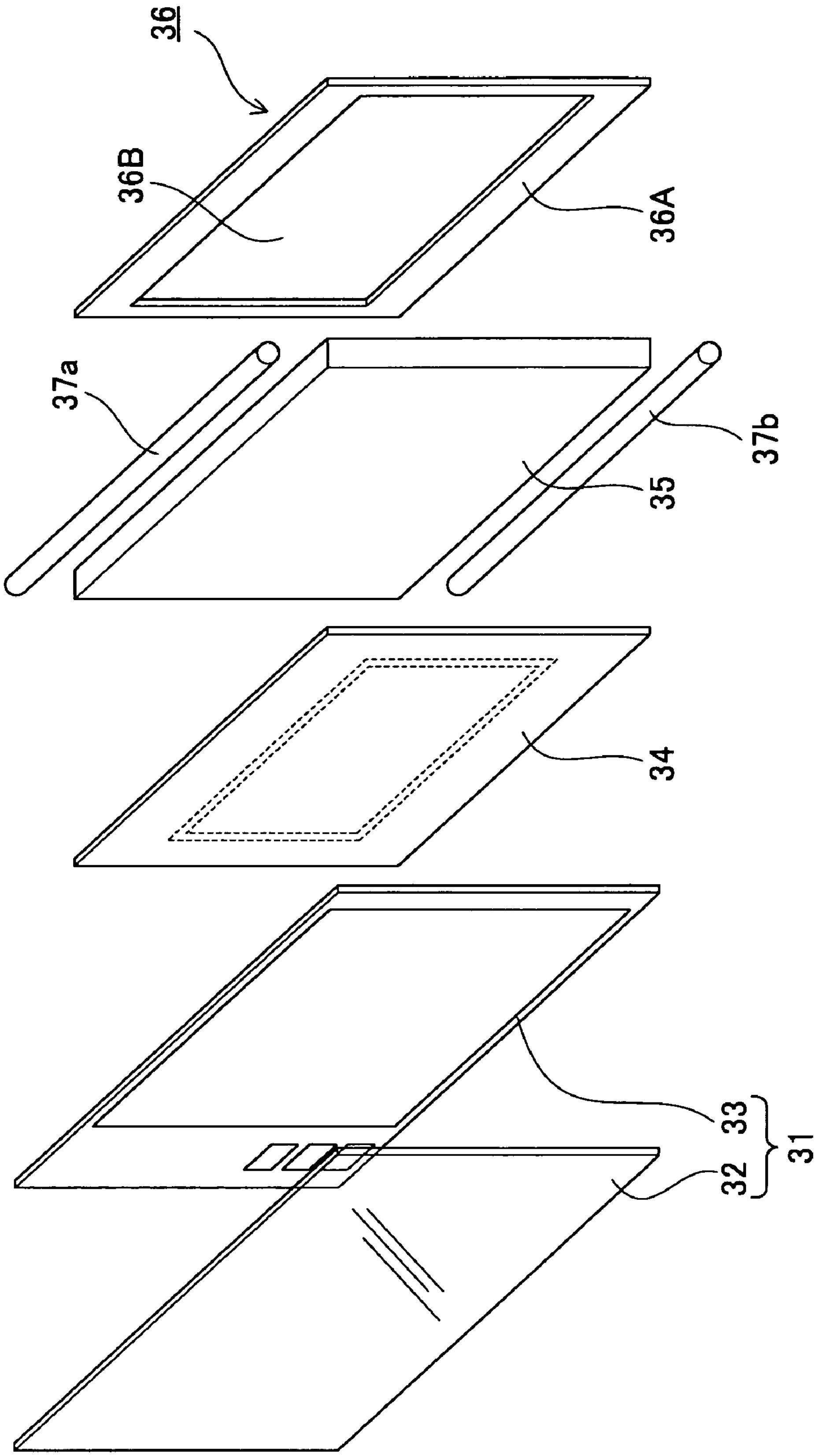
FIG. 7 is a disassembled perspective view which shows a part of the configuration of the liquid crystal display shown in FIG. 6.

FIGS. 6 and 7 are diagrams which show the configuration of the liquid crystal display 30A of the slot machine 13A. The liquid crystal display 30A displays game images for the basic game and the second game. Accordingly, the liquid crystal display 30A comprises: the front panel 31 including the touch panel 32 and a display plate 33; the transparent liquid crystal panel 34; a light introducing plate 35; a reflecting film 36; fluorescent lamps 37*a*, 37*b*, 38*a*, and 38*b*, each of which is a so-called white light source; lamp holders 39*a*, 39*b*, 39*c*, 39*d*, 39*e*, 39*f*, 39*g*, and 39*h*; and a table carrier package (TCP) on which liquid crystal driving ICs have been mounted. While the structure of the TCP is not shown in particular in either FIG. 6 or FIG. 7, a TCP formed with a flexible substrate (not shown) is connected to the terminal of the transparent liquid crystal panel 34.

The liquid crystal display 30A is provided at a position forward of the display regions of mechanical reels 3A through 3E (forward of the display screen 31*a*) such that it covers the mechanical reels 3A through 3E. Here, the mechanical reels 3A through 3E and the liquid crystal display 30A are provided at predetermined intervals. On the other hand, let us consider an arrangement employing the video reels. With such an arrangement, an image of the reels is displayed on the liquid crystal display 30A, instead of the mechanical reels 3A through 3E.

The touch panel 32 is formed of a transparent member. The display plate 33 has designs or the like formed at positions corresponding to the regions between the aforementioned display units 48 through 50. That is to say, the region of the display plate 33 where the designs or the like have been formed serves as the design formation area 31*b*. On the other hand, the region of the display plate 33 where no design or the like has been formed serves as the display screen 31*a* of the front panel 31 (see FIG. 4). Alternatively, an arrangement may be made in which the design formation area 31*b* is not formed on the front panel 31, and the entire area of the front panel 31 serves as the display screen 31*a*. With such an arrangement, there may be no design formed on the display plate 33. Alternatively, the display plate 33 may be eliminated.

Note that an electric circuit or the like is provided for operating the display units 48 through 50 disposed on the rear face side of the display plate 33, which is not shown in FIG. 6 and in FIG. 7.

The transparent liquid crystal panel 34 has a structure in which a transparent substrate such as a glass substrate, upon which a thin film transistor is formed, and another transparent substrate are mounted so as to face each other with a certain gap between them, and the gap between the substrates is filled with a liquid crystal. The display mode of the liquid crystal panel 34 is set to be normally white. The term "normally white" as used here represents a mode in which the liquid crystal panel displays a white image (i.e., allows the player to visually confirm the light passing through the liquid crystal panel toward the side of the display screen) in the state in which the liquid crystal is not driven. As described above, with the present embodiment, the transparent liquid crystal panel 34 is set to be in a normally white state. Such an arrangement allows the player to visually confirm the symbols on the mechanical reels 3A through 3E in a stage when they are in motion and a stage when they are stationary, even if a situation arises in which the liquid crystal cannot be driven, thereby allowing the player to continue the game even if such a situation has occurred. That is to say, even in the case that such an accident has occurred, the player can play the basic game in which predetermined sets of the symbols are made along the active pay lines.

The light introducing plate 35 introduce the light emitted from the fluorescent lamps 37*a* and 37*b* to the transparent liquid crystal panel 34 (in other words, the transparent liquid crystal panel 34 is illuminated). The light introducing plate 35 is provided on the rear face side of the transparent liquid crystal panel 34, and is formed of a transparent member (having a light introducing function) such as an acrylic resin or the like, with a thickness of around 2 cm.

The reflecting film 36 has a structure in which an evaporated silver film is formed on a white polyester film or an aluminum thin film. The reflecting film 36 reflects the light introduced via the light introducing plate 35 towards the front side of the light introducing plate 35. The reflecting film 36 comprises a reflecting region 36A and a non-reflecting region (transmissible region) 36B. Here, the non-reflecting region 36B is formed of a transparent member, and is provided at the region of the front panel 31 that covers the front face of the mechanical reels 3A through 3E.

The fluorescent lamps 37*a* and 37*b* are respectively disposed along the upper end and the lower end of the light introducing plate 35, with the ends of the fluorescent lamp 37*a* held by the lamp holders 39*a* and 39*b*, and the ends of the fluorescent lamp 37*b* held by the lamp holders 39*g* and 39*h*. The light emitted from the fluorescent lamps 37*a* and 37*b* is reflected by the reflecting region 36A of the reflecting film 36, thereby illuminating the transparent liquid crystal panel 34. On the other hand, the fluorescent lamps 38*a* and 38*b* are provided at an upper position and a lower position on the rear side of the reflecting film 36 such that they face the mechanical reels 3A through 3E, with the ends of the fluorescent lamp 38*a* held by the lamp holder 39*c* and 39*d*, and the ends of the fluorescent lamp 38*b* held by the lamp holder 39*e* and 39*f*. The light emitted from these fluorescent lamps 38*a* and 38*b* is reflected by the surfaces of the mechanical reels 3A through 3E, and is input to the non-reflecting region 36*b*, thereby illuminating the transparent liquid crystal panel 34. As described above, with the liquid crystal display 30A, the transparent liquid crystal panel 34 is illuminated by the light which is emitted from the fluorescent lamps 37*a* and 37*b* and which is reflected by the reflecting region 36A of the reflecting film 36, and by the light which is emitted from the fluorescent lamps 38*a* and 38*b*, which is reflected by the surfaces of the mechanical reels 3A through 3E, and which is input to the non-reflecting region 36B. Accordingly, the region of the liquid crystal display 30A that corresponds to the non-reflecting region 36B of the reflecting film 36 has a function of switching its state between a transparent state and an opaque state according to whether or not the liquid crystal is being driven. On the other hand, the region of the liquid crystal display 30A that corresponds to the reflecting region 36A of the reflecting film 36 remains in the opaque state regardless of whether or not the liquid crystal is being driven.

A description is being given regarding the slot machine 13A in which a part of the display screen of the liquid crystal display 30A has a function of switching its state between a transparent state and an opaque state. Also, an arrangement may be made in which the entire area of the display screen of the liquid crystal display 30A has a function of switching its state between a transparent state and an opaque state. With such an arrangement in which the entire area of the display screen of the liquid crystal display 30A has a function of switching its state between a transparent state and an opaque state, the reflecting film 36 is formed of the non-reflecting region 36B alone. Alternatively, the reflecting film 36 may be eliminated.

Figure 8:
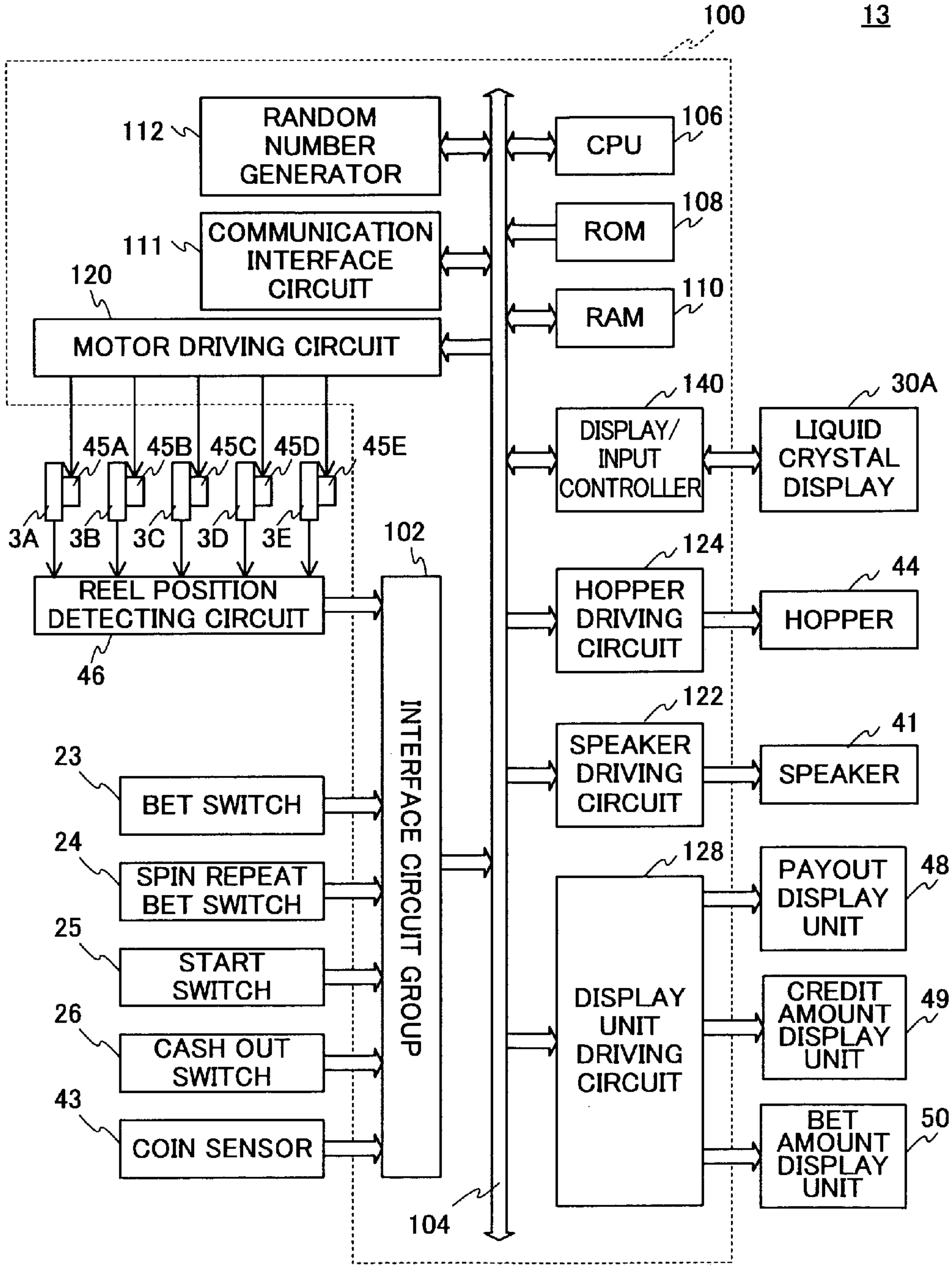
FIG. 8 is a block diagram which shows an electrical configuration of a controller of a mechanical reel slot machine according to the embodiment of the present invention.

FIG. 8 is a block diagram which shows an electrical configuration of the controller 100 of the slot machine 13A for controlling the mechanical reels. As shown in FIG. 8, the controller of the slot machine 13A is a micro computer, and includes the interface circuit group 102, the input/output bus 104, the CPU 106, the ROM 108, the RAM 110, the communication interface circuit 111, the random number generator 112, the motor driving circuit 120, the speaker driving circuit 122, the hopper driving circuit 124, the display unit driving circuit 128, and the display/input controller 140. Note that the aforementioned controller 100 has the same configuration as that for controlling the video reels described with reference to FIG. 5, except for a part of the configuration. Accordingly, a description will be given regarding only that which differs from an arrangement for controlling the video reels described with reference to FIG. 5.

A reel position detecting circuit 46 is connected to the interface circuit group 102. The reel position detecting circuit 46 is a circuit for detecting the rotational position for each of the mechanical reels 3A through 3E based upon the pulse signals received from a reel rotational position sensor (not shown). The detection signal output from the reel position detecting circuit 46 is also supplied to the interface circuit group 102, and is converted into a predetermined signal by the interface circuit group 102. The detection signal thus converted is supplied to the input/output bus 104.

Upon reception of the basic game start operation instruction input through the start switch 25, which serves as a trigger, the CPU 106 reads out a basic game program, and executes the basic game. The basic game program has been programmed so as to instruct the CPU 106 to perform the following operation. That is to say, according to the basic game program, the CPU 106 instructs each of the stepping motors 45A through 45E to rotate all the mechanical reels 3A through 3E, thereby commencing the scrolling of the symbols on the reels 3A through 3E. After a period of time has elapsed, the CPU 106 stops the driving of the stepping motors 45A through 45E so as to stop the rotation of all the mechanical reels 3A through 3E, whereupon a new combination of symbols is made along the active pay lines. In the case that a particular combination of the symbols for providing an award has been made along any one of the active pay lines when they are stationary, the CPU 106 pays out a predetermined amount of coins corresponding to the particular combination for providing the award.

Furthermore, the CPU 106 controls the second game. With such an arrangement, in the case that a predetermined condition has been satisfied after the symbols on all the mechanical reels 3A through 3E have been displayed in the stationary state, the CPU 106 transmits a signal for executing the second game.

Furthermore, a motor driving circuit 120 for driving the stepping motors 45A through 45E is connected to the input/output bus 104. Upon the occurrence of a predetermined event, the CPU 106 controls the operation of the stepping motors 45A through 45E via the motor driving circuit 120.

Figure 9:
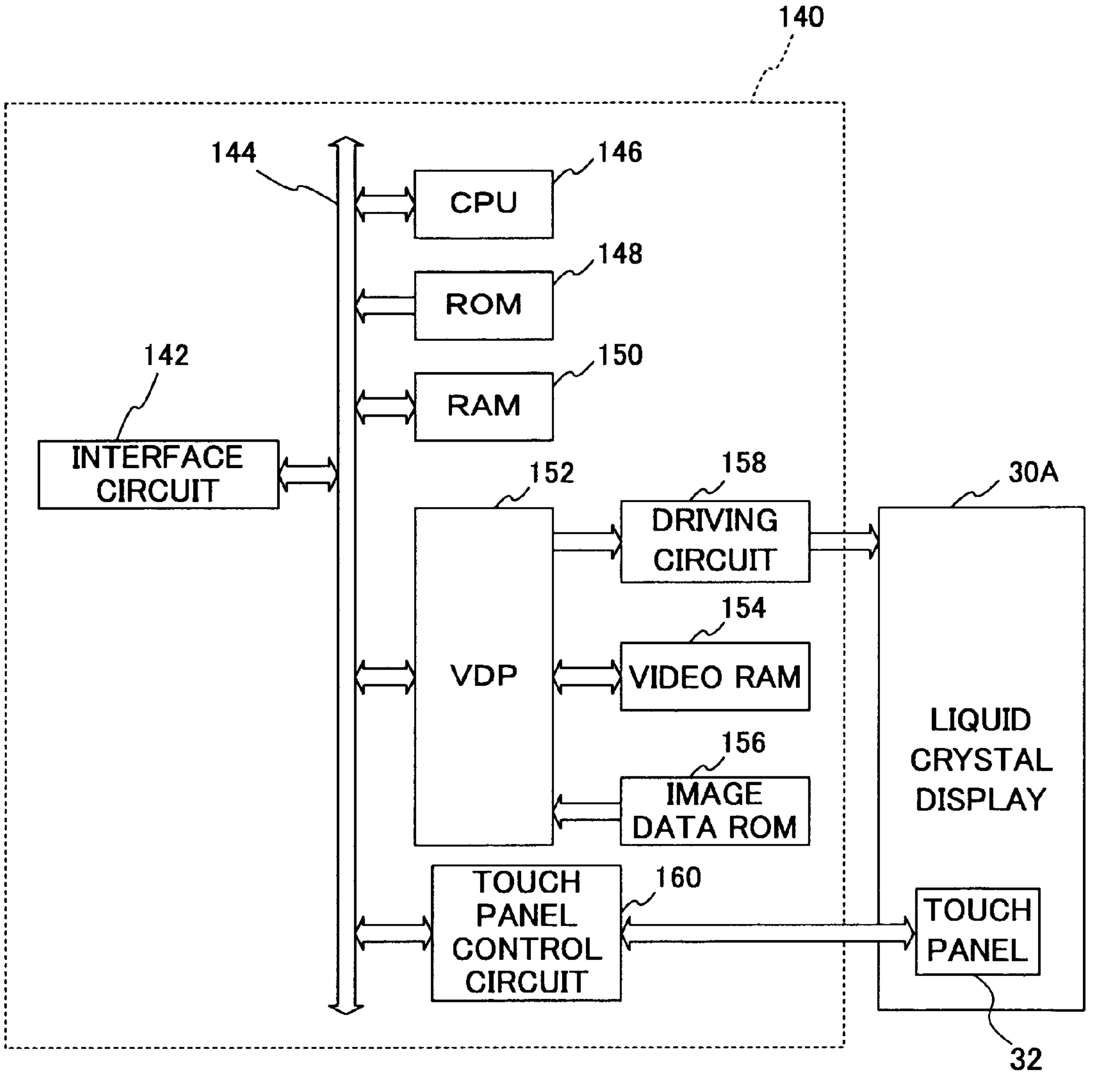
FIG. 9 is a block diagram which shows an electrical configuration of a display/input controller of the slot machine according to the embodiment of the present invention.

FIG. 9 is a block diagram which shows an electrical configuration of the display/input controller 140 of the slot machine 13A. The display/input controller 140 of the slot machine 13A is a sub-microcomputer for performing image display processing and input control for the touch panel 32. The display/input controller 140 comprises an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. The image display command output from the CPU 106 of the aforementioned controller 100 is supplied to the input/output bus 144 via the interface circuit 142. The input/output bus 144 performs input/output of data signals or address signals to/from the CPU 146.

Furthermore, the ROM 148 and the RAM 150 are connected to the input/output bus 144. The ROM 148 stores a display control program for generating a driving signal, which is to be supplied to the liquid crystal display 30A, according to an image display command received from the CPU 106 of the aforementioned controller 100. The RAM 150 stores flags and variables used in the aforementioned display control program.

Furthermore, the VDP 152 is connected to the input/output bus 144. The VDP 152 includes a so-called sprite circuit, a screen circuit, a palette circuit, etc, and can perform various kinds of processing for displaying images on the liquid crystal display 30A. With such an arrangement, the components connected to the DVP 152 include: the video RAM 154 for storing image data according to the image display command received from the CPU 106 of the aforementioned controller 100; and the image data ROM 156 for storing various kinds of image data including the aforementioned image data for visual effects etc. Furthermore, the driving circuit 158 for outputting a driving signal for driving the liquid crystal display 30A is connected to the VDP 152.

The aforementioned CPU 146 instructs the video RAM 154 to store the image data which is to be displayed on the liquid crystal display 30A according to the image display command received from the CPU 106 of the aforementioned controller 100 by reading out the display control program stored in the ROM 148 and by executing the program thus read out. Examples of the image display commands include various kinds of image display commands including the aforementioned image display commands for visual effects etc.

The image data ROM 156 stores various kinds of image data including the aforementioned image data for visual effects etc.

The touch panel control circuit 160 transmits the signals input via the touch panel 32 provided on the liquid crystal display 30A to the CPU 106 via the input/output bus 144 in the form of an input signal.

Figure 10:
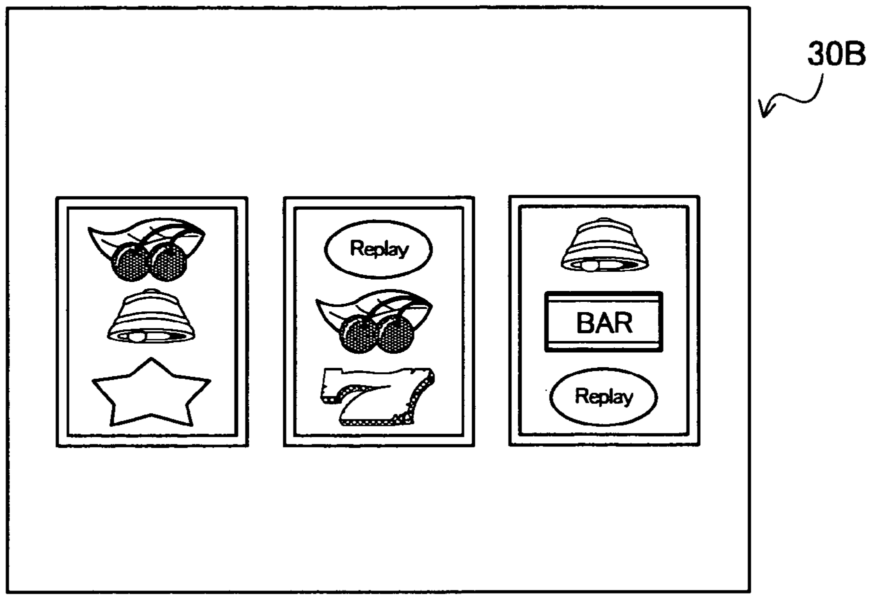
FIG. 10 shows an example of what is displayed on the slot machine according to the embodiment of the present invention.
Figure 11:
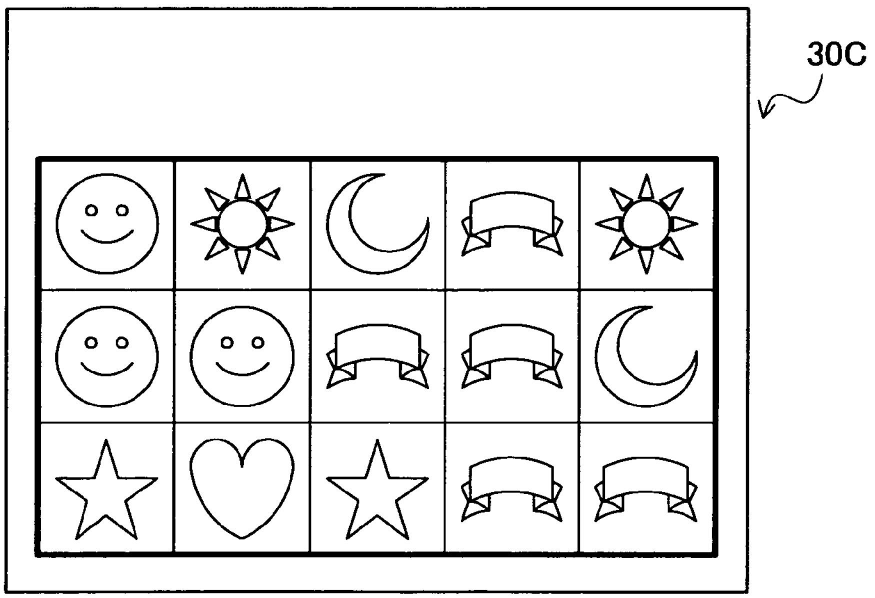
FIG. 11 shows an example of what is displayed on the slot machine according to the embodiment of the present invention.

FIGS. 10 and 11 show examples of what is displayed on liquid crystal displays 30B and 30C of the kinds of slot machines 13B and 13C, which differ from the kind of slot machine 13A described above with reference to FIGS. 3 through 9. Both the slot machines 30B and 30C have the same basic configuration as that of the slot machine 13A described above with reference to FIGS. 3 through 9. The slot machine 13B shown in FIG. 10 comprises three mechanical reels, each of which has multiple kinds of symbols depicted on its outer face, rotatably provided along the horizontal line. On the other hand, the slot machine 13C shown in FIG. 11 has a configuration in which five video reels are displayed on a liquid crystal display 30C instead of the mechanical reels. Each slot machine has predetermined active pay lines. With such an arrangement, in the case that a predetermined combination has come to a stop along an active pay line, either a predetermined amount of coins is paid out according to the combination formed when the reels are stationary, or the game is switched to the second game.

Figure 12:
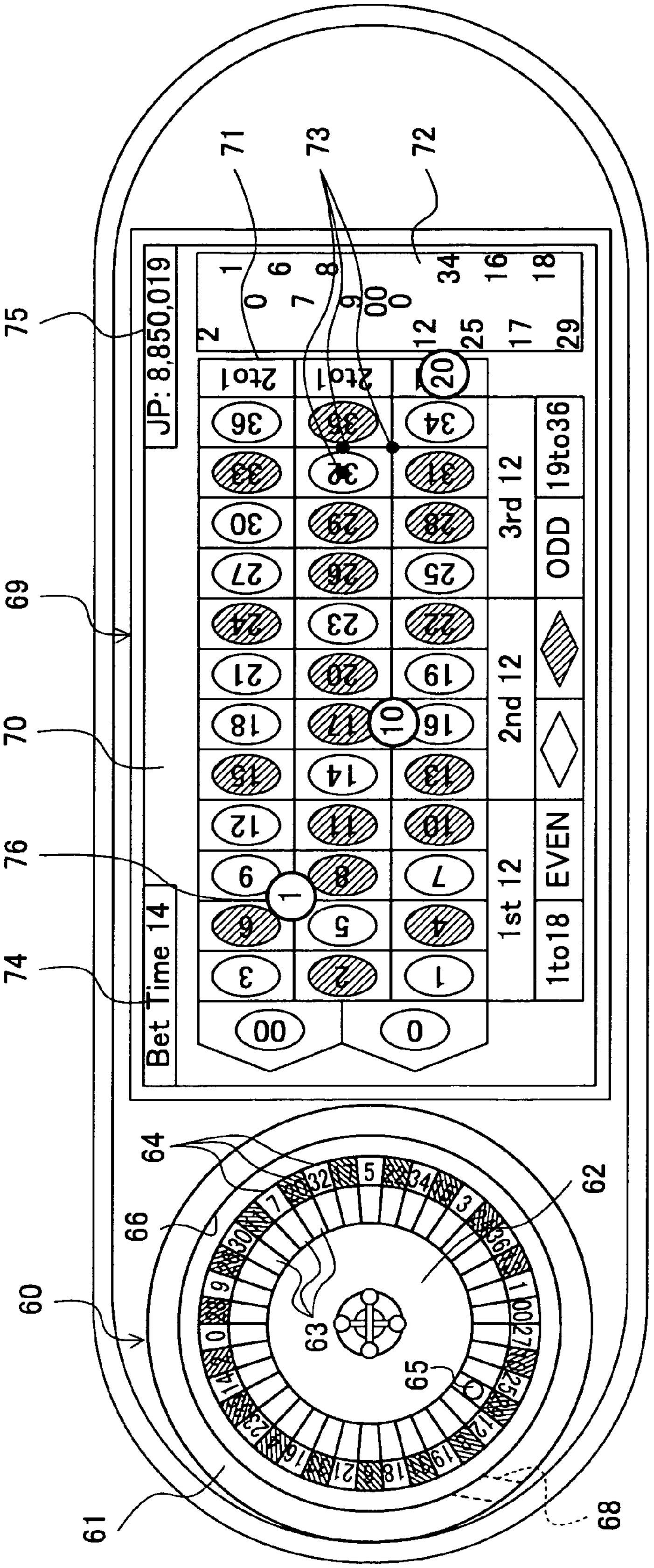
FIG. 12 is a plan view which shows a second gaming device according to the embodiment of the present invention.

FIG. 12 is a plan view which shows the second gaming device 11. As shown in FIG. 2, the second gaming device 11 principally comprises the roulette device 60 and the display 69 for displaying the BET screen 70, including the betting board 71 etc.

The roulette device 60 basically comprises a frame 61 fixed to the second gaming device 11 and a wheel 62 rotatably held and stored within the frame 61. Here, the wheel 62 has a number of number pockets 63 (a total of 38 number pockets in the present embodiment) formed in the shape of recesses on the upper face of the wheel 62. Furthermore, each of the number pockets 63 includes a number display plate 64, which display a number corresponding to the respective number pocket 63 in the form of a design, formed at the outer part of the respective number pocket 63 formed on the upper face of the wheel 62. Such numbers provided in the number pockets 63 include "0", "00", and "1" to "36". In other words, a total of 38 number pockets 63 are formed on the wheel 62, each of which has a corresponding number provided from among the numbers "0", "00", and "1" to "36".

Furthermore, a ball supply opening 68 is formed within the aforementioned frame 61. Here, a ball supply device (not shown) is connected to the ball supply opening 68, which allows a ball 65 to be supplied onto the wheel 62 from the ball supply opening 68 by driving the ball supply device. Furthermore, the entire area above the roulette board is covered with a transparent acrylic cover member 67 formed in a hemispherical shape (see FIG. 2).

Furthermore, a win determination device (not shown) is provided below the wheel 62. The win determination device is provided for determining which one of the number pockets 63 has received the ball 65. Furthermore, a ball collecting device (not shown) is provided below the wheel 62. The ball collecting device is provided for collecting the ball 65 remaining on the wheel 62 after the game. Note that the ball supply device, the win determination device, and the ball collecting device are known devices, and, accordingly, detailed descriptions thereof will be omitted.

Here, the wheel 61 is formed such that it gently slopes downward toward the inner side, and has a guide wall 66 formed along an intermediate region. The guide wall 66 allows the ball 65 thus supplied to move around the roulette wheel while guiding the ball 65 against its centrifugal force. As the ball 65 loses its centrifugal force due to reduction in its rotational speed, the ball 65 rolls down along the slope of the frame 61, whereupon the ball 65 reaches the rotating wheel 62.

Then, the ball 65 rolling down to the rotating wheel 62 is received by any one among the number pockets 63 through the number display plate 64 provided to outer perimeter of the wheel 62. As a result, the ball 65 is retained in the number pocket 63, and the win determination device detects the number marked on the number display plate 64 that corresponds to the number pocket 63 that has retained the ball 65, thereby determining the winning number.

On the other hand, the display 69 for displaying the BET screen 70 including the betting board 71 is a liquid crystal display, for example. Upon the player betting a chip using a deposited credit by operating the slot machines 13A, 13B, . . . , and 13H, as described later, the chip thus bet is displayed. Note that the gaming media such as coins or the like for the slot machines 13A, 13B, . . . , and 13H serve as a credit for the roulette game in the form of a chip. Note that a description is being made regarding an arrangement in which the BET screen 70 is displayed on the display 69. Also, an arrangement may be made in which the BET screen 70 is displayed on a screen using a projector or the like installed on the ceiling such that it faces downward along the vertical direction, instead of the display 69. Such an arrangement permits the anticipation of visual effects that enable the BET screen 70 to be displayed with a greater realism, such as a visual effect in which the chip thus bet is displayed in a three-dimensional manner.

The betting board 71 displayed on the BET screen 70 on the display 69 has numbers that match the 38 kinds of numbers "0", "00", and "1" to "36" which are displayed in the form of a matrix. Furthermore, special BET areas 73, which allow the player to bet on "odd numbers", "even numbers", "the color of the number display plate 64 (red or black)", "a predetermined range of the numbers (e.g., "1" to "12")", are provided in the form of a matrix in the same way.

Furthermore, a result history display unit 72 is displayed on the right side of the betting board 71. The result history display unit 72 displays the results of the winning numbers of the past games up to and including the preceding game in the form of a list. The term "one game" as used here represents a series of stages from a stage in which the player places bets via any one of the slot machines 13A, 13B, . . . , and 13H up to a stage in which a credit is paid out according to the winning number after the ball 65 has dropped in the number pocket 63. With such an arrangement, upon completion of one game, a new winning number is added to the top field of the list, which can allow the players to confirm the history of the winning numbers of a maximum of 16 games.

With such an arrangement, upon the player betting a chip using any one of the slot machines 13A, 13B, . . . , and 13H, the chip thus bet is put in the BET area 73 (in any one of the squares, each of which has a respective number or mark, or on one of the lines defining the squares).

Furthermore, a BET time display unit 74 is provided at an upper portion of the betting board 71. The BET time display unit 74 displays time remaining during which the player can place bets. For example, the BET time display unit 74 displays the time remaining "30" at the time of starting to receive the betting. Then, the time remaining displayed by the BET time display unit 74 is reduced in decrements of 1 for each second. Upon the time remaining becoming zero, the period for receiving bets expires. Furthermore, when the time remaining for receiving bets from the players at the slot machines 13A, 13B, . . . , and 13H becomes 5 seconds, the ball 65 is supplied to the roulette board by driving the ball supply device.

Furthermore, a JP display unit 75 for displaying the amount of the credit accumulated up to the current point in time is provided on the right side of the BET time display unit 74. Here, the JP display unit 75 displays the amount of the credit obtained as 0.5% of the accumulated credit bet via the total 8 slot machines 13A, 13B, . . . , and 13H, and other terminals participating in the second game. In the case that a predetermined condition has been satisfied in a jackpot bonus game that occurs at a certain timing, the player wins in the jackpot bonus game, and the credit amount for the jackpot is paid out, whereupon the JP display unit 75 displays an initial value (e.g., 50,000 credits) after the payout.

Furthermore, chip marks 76 are displayed on the betting board 71, each of which indicates the amount of the chip and the BET area 73 on which the chip has been bet up to the current point in time. Here, the number displayed on the chip mark 76 represents the amount of the chip thus bet. For example, the "1" chip mark 76 located at the intersection of the lines that define the squares "5", "6", "8", and "9" as shown in FIG. 12 indicates that one chip has been bet so as to cover the four numbers "5", "6", "8", and "9". Note that a method for placing a bet so as to cover four numbers as described above is referred to as "corner bet".

On the other hand, the "20" chip mark 76 located in the square "2 to 1" indicates that twenty chips have been bet so as to cover the twelve numbers "1", "4", "7", . . . , that form a column. Note that a method for placing a bet so as to cover twelve numbers by locating the chip in the square having a mark of "2 to 1" is referred to as a "column bet".

Examples of the other betting methods include: "straight bet" for placing a bet on only one number; "split bet" for placing a bet so as to cover two numbers by locating the chip on the line between the squares of the two numbers; a "street bet" for placing a bet so as to cover three numbers (e.g., "13", "14", and "15") by locating the chip at the edge of the row of the numbers (each row along the vertical direction in FIG. 12); a "five bet" for placing a bet so as to cover five numbers "0", "00", "1", "2", and "3" by locating the chip on the line between the squares of the numbers "00" and "3"; a "line bet" for placing a bet so as to cover six numbers (e.g., "13", "14", "15", "16", "17", and "18") by locating the chip at the end of the line between the two rows of the numbers (two rows along the vertical direction in FIG. 12); a "dozen bet" for placing a bet so as to cover twelve numbers by locating the chip at any one of the squares having respective marks of "1st 12", "2nd 12", and "3rd 12". In addition, examples of other betting methods include: a "red/black bet" for placing a bet on the color of the number display plate 64; an "even/odd bet" for placing a bet on whether the number is an odd number or an even number; and a "low/high bet" for placing a bet on whether the number is 18 or less, or is 19 or more, so as to cover eighteen numbers, using one of six squares provided the lower end of the betting board 71. Here, there is a difference in the amount of payout (payout rate) for each chip for the aforementioned betting methods, which is employed for the payout after the player has won the bet.

Figure 13:
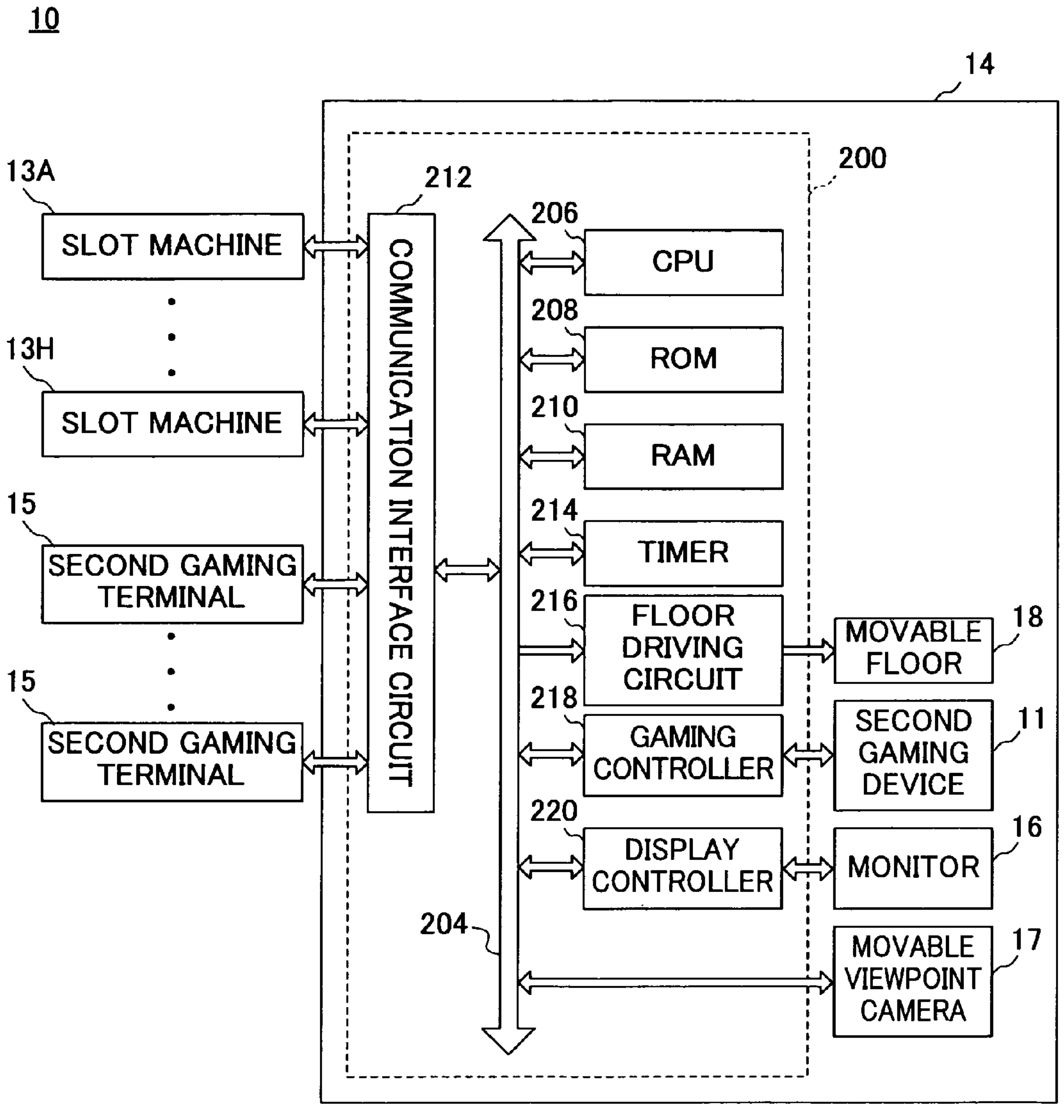
FIG. 13 is a block diagram which shows an electrical configuration of a central controller according to the embodiment of the present invention.

FIG. 13 is a block diagram which shows an electrical configuration of a controller 200 of the central controller 14. As shown in FIG. 13, the central controller 14 comprises the controller 200 of the central controller 14 and several peripheral devices. Furthermore, the multiple slot machines 13A, 13B, . . . , and 13H (eight slot machines in the present embodiment) and the multiple second gaming terminals 15 (four second gaming terminals in the present embodiment) are connected to the central controller 14 via a communication interface circuit 212 of the central controller 14.

Furthermore, the controller 200 of the central controller 14 includes an input/output bus 204, a CPU 206, ROM 208, RAM 210, a communication interface circuit 212, a timer 214, a floor driving circuit 216, a gaming controller 218, and a display controller 220.

The ROM 208 and the RAM 210 are connected to the input/output bus 204.

The CPU 206 performs various kinds of processing according to an input signal supplied from each of the slot machines 13A, 13B, . . . , and 13H and the second gaming terminals 15, and data and programs stored the ROM 208 and the RAM 210. Furthermore, the CPU 206 transmits command signals to the slot machines 13A, 13B, . . . , and 13H, and the second gaming terminals 15 based upon the results of the processing thus performed. Thus, the CPU 206 centrally controls each of the slot machines 13A, 13B, . . . , and 13H, and the second gaming terminals 15, thereby advancing the game. Furthermore, the input/output bus 204 is connected to the second gaming device 11 via the gaming controller 218. The CPU 206 drives unshown driving motors provided to the roulette device 60 of the second gaming device 11, thereby allowing the ball 65 to be supplied, and allowing the wheel 62 to be rotated. Furthermore, the CPU 206 controls the win determination device for identifying the position at which the ball 65 has dropped. This allows the winning number to be determined based upon the position at which the ball 65 has dropped. The CPU 206 makes a win determination for each bet chip based upon the winning number thus obtained, and the bet information transmitted from each of the slot machines 13A, 13B, . . . , and 13H, and the second gaming terminals 15. Furthermore, the CPU 206 calculates the credit amount which is to be paid out at each of the slot machines 13A, 13B, . . . , and 13H, and the second gaming terminals 15.

The ROM 208 comprises semiconductor memory or the like, for example. The ROM 208 stores a program for providing the basic functions of the second gaming device 11, a program for providing the functions of the movable viewpoint cameras 17, a program for centrally controlling each of the slot machines 13A, 13B, . . . , and 13H, and the second gaming terminals 15. Examples of such programs include a program shown in FIGS. 20A through 20D, and FIG. 21. Furthermore, the ROM 208 stores the payout rate for the roulette game (the credit amount for each chip to be paid out to a winning player).

Specifically, the ROM 208 includes a payout credit storage area (not shown) for storing each payout rate with respect to the roulette game using the BET screen 70. A second game payout table described later with reference to FIG. 17 is stored in the payout credit storage area. Note that each payout rate corresponding to a respective BET area 73 of the BET screen 70 is determined beforehand and stored in the payout credit storage area. Examples of such payout rates include from "×2" to "×36", which are associated with the kind of betting method ("straight bet", "corner bet", "split bet", etc.). Furthermore, the ROM 208 stores various kinds of determining tables described later with reference to FIGS. 15 and 18.

On the other hand, the RAM 210 temporarily stores bet information with respect to the chip supplied from the slot machines 13A, 13B, . . . , and 13H and the second gaming terminals 15, the winning number of the roulette device 60 determined by the win determination device, the amount of jackpot accumulated up to the current point in time, and the results of the processing executed by the CPU 206, etc.

Specifically, the RAM 210 includes: a bet information storage area for storing bet information with respect to the players who are playing; a winning number storage area for storing the winning number of the roulette device 60 determined by the win determination device; and a jackpot accumulation storage area (not shown) for storing the credit amount obtained as 0.5% of the accumulated credit amount which has been bet on the BET screen 70 (see FIG. 12). Note that, more specifically, the term "bet information" as used here represents the information with respect to the bets placed using the slot machine 13A, 13B, . . . , and 13H, and the second gaming terminals 15 such as the information regarding the BET area 73 specified on the BET screen 70, the amount of chips thus bet (bet amount), the kinds of betting methods, etc.

The timer 214 for performing time measurement is connected to the input/output bus 204. The time information supplied from the timer 214 is transmitted to the CPU 206 via the input/output bus 204. The CPU 206 rotates the wheel 62 and supplies the ball 65 based upon the time information received from the timer 214.

Furthermore, the floor driving circuit 216 is connected to the input/output bus 204. Upon reception of a signal for starting the second game from any one of the slot machines 13A, 13B, . . . , and 13H, the CPU 206 performs control so as to raise the movable floor 18 via the floor driving circuit 216. Also, upon reception of a signal for ending the second game from any one of the slot machine 13A, 13B, . . . , and 13H, the CPU 206 performs control so as to lower the movable floor 18 via the floor driving circuit 216.

Furthermore, the display controller 220 is connected to the input/output bus 204. The CPU 206 performs various kinds of processing based upon the data and programs stored in the ROM 208 and the RAM 210. The CPU 206 controls the monitor 16 and captures images based upon the results of the processing thus performed.

Furthermore, the movable viewpoint cameras 17 are connected to the input/output bus 204. The CPU 206 performs various kinds of processing based upon the data and programs stored in the ROM 208 and the RAM 210. The CPU 206 controls the movable viewpoint cameras 17 and captures images based upon the results of the processing thus performed.

FIG. 14 shows a basic game random number table used in the basic game performed by the slot machine 13A described later with reference to FIG. 19. In the basic game random number table, entries representing a range of random numbers and the probability of winning are associated with each of the particular winning combinations. Accordingly, in the combination determination processing (Step S5 shown in FIG. 19), in the case that a random number extracted from a range of numbers between "0" and "65535" is any one of the numbers in the range between "3000" and "4999", for example, the internal component of the slot machine 13A determines to generate a particular combination for providing a "J" winning as the final result of the basic game. In other words, the probability is "2000/65536" that the combination of the symbols when they are stationary will match a particular combination for providing the "J" winning. Also, in the case that a random number extracted from a range of numbers between "0" and "65535" is any one of the numbers in the range between "8000" and "(a−1)", for example, the internal component of the slot machine 13A determines to generate a particular combination for providing a "BONUS" winning as the final result of the basic game. In other words, the probability is "(b)/65536" that the combination of the symbols when they are stationary will match a particular combination for providing the "BONUS" winning. The values "(a−1)" and "(b)" are changed in table determining processing described later with reference to FIG. 21. When the power supply of the gaming system 10 in the amusement facility is turned on (at the time of the start of the game), the aforementioned values are set to the values corresponding to a payout pattern 2 described later with reference to FIG. 15. Accordingly, at the time of the start of the game, the probability is "1000/65536" that the combination of the symbols when they are stationary will match a particular combination for providing the "BONUS" winning. On the other hand, the probability is "56536/65536" that the combination of the symbols when they are stationary will match any one of the other combinations, which are losing combinations.

FIG. 15 shows a basic game switching probability determining table determined as described later with reference to FIG. 21. With regard to the basic game switching probability determining table, the probability of the basic game being switched to the second game is changed based upon which range of values includes the value obtained by dividing the total payout amount from the slot machines 13A, 13B, . . . , and 13H by the total amount of inserted coins. For example, in the case of the "(payout amount)/(inserted amount)" value matching 0.78 for the slot machines 13A, 13B, . . . , and 13H, the payout pattern 1 is employed. Accordingly, the range of random numbers for providing a "BONUS" combination matches a range of from "8000" to "9999". Accordingly, the probability is "2000/65536" that the BONUS winning will be determined. On the other hand, the range of random numbers for providing a losing combination matches a range of from "10000" to "65535". Accordingly, the probability is "55536/65536" that a losing combination will be determined.

Note that a description has been given regarding an arrangement in which the "(payout amount)/(inserted amount)" value is determined for the total of all the slot machines 13A, 13B, . . . , and 13H. Also, an arrangement may be made in which the "(payout amount)/(inserted amount)" value is determined for each of the slot machines 13A, 13B, . . . , and 13H (e.g., the slot machine 13A). Also, a description has been given with reference to FIG. 15 regarding an arrangement in which the "(payout amount)/(inserted amount)" value is classified into three payout patterns, and the probability of a particular combination for providing the "BONUS" winning being selected is determined using the payout patterns thus classified. The present invention is not restricted to such an arrangement. Also, an arrangement may be made in which the "(payout amount)/(inserted amount)" value is classified into three or more payout patterns. Also, each range of the "(payout amount)/(inserted amount)" values and the switching probabilities that correspond to such ranges are not restricted to the aforementioned arrangement.

FIG. 16 shows a basic game payout table used in the basic game described later with reference to FIG. 19. In the basic game payout table, the coin amount to be paid out is registered in association with each particular combination for providing an award for each credit amount bet on one game. Let us consider a stage in which a determination is made for whether or not the combination thus generated matches any one of the particular combinations for providing an award. In this stage, let us consider the case in which the combination thus generated matches the combination "K". In this case, in the case that the credit amount bet is "1", 10 coins are paid out. In the case that the credit amount bet is "2", 20 coins are paid out. In the case that the credit amount bet is "3", 30 coins are paid out. On the other hand, let us consider the case in which the combination thus generated matches the combination "BONUS". In this case, in the case that the credit amount bet is "1", 100 coins credit data is transmitted to the central controller 14. In the same way, in the case that the credit amount bet is "2", 200 coins credit data is transmitted to the central controller 14. Also, in the case that the credit amount bet is "3", 300 coins credit data is transmitted to the central controller 14. The credit data thus transmitted is available as a credit in the second game described later.

FIG. 17 shows an example of a second game payout table used in the roulette game described later with reference to FIGS. 20A through 20D. In the second game payout table, entries representing the permissible range of the betting methods and the payout rate for a won game are associated with the credit amount bet on the basic game at the slot machine 13A, for example. Note that the credit paid out at the slot machine 13A as the final result is calculated as follows, for example. The credit amount thus bet is multiplied by the factor determined corresponding to the betting method as shown in FIG. 17. Then, the product is further multiplied by a weighting factor described later with reference to FIG. 18, thereby calculating the amount of credits to be paid out at the slot machine 13A. Note that the credit amount thus calculated is rounded down.

For example, with regard to the slot machine 13A, the permissible range of the betting methods is changed according to the credit amount bet on the basic game when the player has won a particular combination for providing the "BONUS" winning. In the case that the credit amount is 1 when the player has won a particular combination for providing the "BONUS" winning, the betting methods available for the roulette game are at least one of the "straight bet", "split bet", and "street bet". Note that an arrangement may be made in which multiple bets are permitted. With such an arrangement, multiple bets can be placed on the "straight bet". Also, multiple bets can be placed on both the "straight bet" and the "split bet".

Note that FIG. 17 shows an example in the present embodiment for exemplary purposes only. Also, the payout rate for each BET area 73 on the BET screen 70 stored in the payout credit storage area may be changed for each of the slot machines 13A, 13B, . . . , and 13H.

A description has been given regarding an arrangement with reference to FIG. 17 in which the betting method is restricted according to the credit amount bet on the basic game at the slot machine 13A. Also, an arrangement may be made in which the payout rate is determined based upon the credit amount bet on the basic game at the slot machine 13A. Also, an arrangement may be made which permits the player to use the coins at the slot machine 13A as additional credits for the roulette game, and the payout rate is changed based upon the additional credit amount. Alternatively, the payout rate may be changed based upon the total amount of chips bet.

As shown in the second game payout table in FIG. 17, the payout rates in the roulette game are set to relatively high values. This permits the anticipation of high payouts, depending upon the user's betting method.

FIG. 18 shows a second game payout determining table determined as described later with reference to FIG. 21. With the second game payout determining table, the payout for a second game winner is changed based upon which range of values includes the value obtained by dividing the total payout amount for the slot machines 13A, 13B, . . . , and 13H, by the total inserted coins. For example, in the case that the "(payout amount)/(inserted amount)" value is 0.78 for the slot machines 13A, 13B, . . . , and 13H, the payout pattern 1 shown in FIG. 18 is employed. In this case, let us say that, after the basic game at the slot machine 13A with the credit amount of 1, the player has won a two chip bet on the "straight bet". In this case, the player wins 108 chips in the form of credits, which is calculated as follows. First, the two chips are multiplied by the payout rate "36" for the "straight bet" shown in FIG. 17. The product thus calculated is further multiplied by "1.5" which is the weighting factor of the payout pattern 1, thereby calculating the amount of chips to be paid out.

Note that a description has been given regarding an arrangement in which the "(payout amount)/(inserted amount)" value is determined for the total of all the slot machines 13A, 13B, . . . , and 13H. Also, an arrangement may be made in which the "(payout amount)/(inserted amount)" value is determined for each of the slot machines 13A, 13B, . . . , and 13H (e.g., the slot machine 13A). Also, a description has been given with reference to FIG. 18 regarding an arrangement in which the "(payout amount)/(inserted amount)" value is classified into three payout patterns. The present invention is not restricted to such an arrangement. Also, an arrangement may be made in which the "(payout amount)/(inserted amount)" value is classified into three or more payout patterns. Also, the ranges of the "(payout amount)/(inserted amount)" values and the corresponding weighting factors are not restricted to the aforementioned arrangement.

Figure 19:
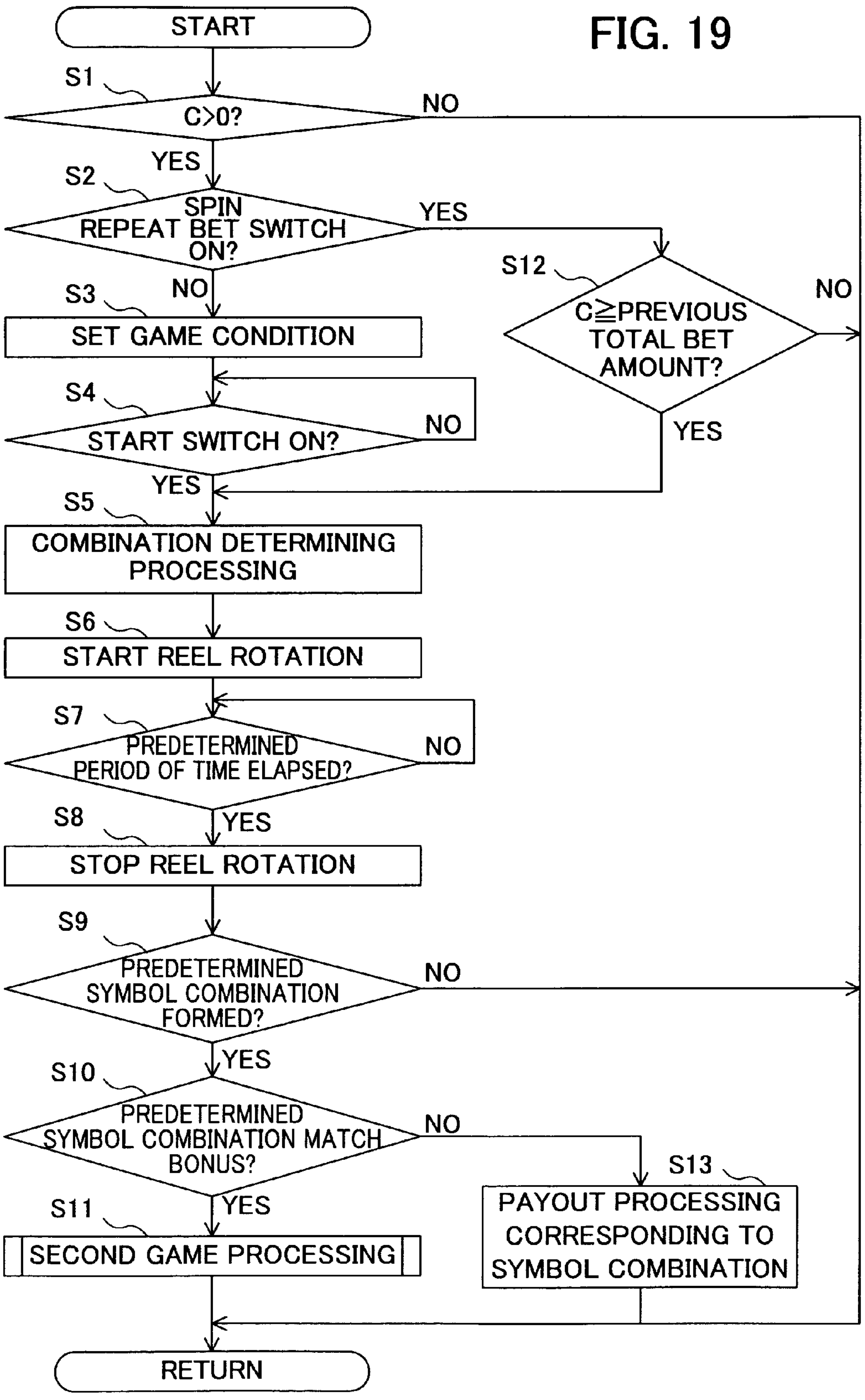
FIG. 19 is a flowchart which shows a processing flow in the basic game executed by the slot machine according to the embodiment of the present invention.

FIG. 19 is a flowchart which shows the flow of the processing and the operation of the slot machine 13A in the basic game, which is executed by the controller 100 of the slot machine 13A. The processing and operation are executed by calling a sub-program from a main program for the slot machine 13A at a predetermined timing. Note that each of the other slot machines 13B, . . . , and 13H operates in the same way, except that the predetermined symbol combinations are different for each of the slot machines 13.

A description will be given below regarding the case in which the slot machine 13A has been activated beforehand. Furthermore, let us say that the variables used by the CPU 106 included in the aforementioned controller 100 have been initialized to predetermined values, thereby operating the slot machine 13A in a normal state.

First, the CPU 106 included in the aforementioned controller 100 determines whether or not any coins inserted by the player (Step S1) are remaining. Specifically, the CPU 106 reads out the credit amount C stored in the RAM 110, and performs processing based upon the credit amount C thus read out. In the case that the credit amount C is "0" (in the case of "NO" in the determination processing in Step S1), the CPU 106 cannot start the game, and accordingly, the CPU 106 ends this routine without performing any processing. On the other hand, in the case that the credit amount C is "1" or more (in the case of "YES" in the determination processing in Step S1), the CPU 106 determines that there is at least one coin remaining, and the flow proceeds to Step S2.

In the following Step S2, the CPU 106 determines whether or not the spin repeat bet switch 24 has been pushed. In the case that the spin repeat bet switch 24 has been pushed, and accordingly, in the case that the operation signal has been input from the spin repeat bet switch 24 (in the case of "YES" in the determination processing in Step S2), the flow proceeds to Step S12 according to the instruction from the CPU 106. On the other hand, in the case that the operation signal has not been input from the spin repeat bet switch 24 within a predetermined period of time (in the case of "NO" in the determination processing in Step S2), the CPU 106 determines that the spin repeat bet switch 24 has not been pushed, and the flow proceeds to Step S3.

In the following Step S3, the CPU 106 sets the game conditions. Specifically, the CPU 106 determines the amount of coins bet on the active pay lines in this game. The CPU 106 receives the operation signals generated by the player operating the BET switch 23. Then, the CPU 106 determines the BET amount to be bet on the active pay lines based upon the number of times the signals that indicate operation of the BET switch 23 have been received, and stores the BET amount thus determined in a predetermined memory area of the RAM 110. The CPU 106 reads out the credit amount C stored in a predetermined memory area of the RAM 110, and subtracts the total BET amount, which is the sum of the aforementioned BET amounts, from the credit amount C thus read out. Then, the CPU 106 stores the subtracted value in a predetermined memory area of the RAM 110. Subsequently, the flow proceeds to Step S4 according to the instructions from the CPU 106.

In the following Step S4, the CPU 106 determines whether or not the start switch 25 is ON, i.e., waits for the start switch 35 to be operated. Upon the start switch 25 being operated, and accordingly, upon the operation signal being input from the start switch 25 (in the case of "YES" in the determination processing in Step S4), the CPU 106 determines that the start switch 25 has been operated, and the flow proceeds to Step S5.

On the other hand, in the case that the flow has proceeded to Step S12, the CPU 106 determines whether or not the credit amount C is equal to or greater than the total bet amount bet on the previous game. In other words, the CPU 106 determines whether or not the player can start the game by pushing the spin repeat bet switch 24. Specifically, in the case that the spin repeat bet switch 24 has been pushed, and accordingly, in the case that the operation signal has been input from the aforementioned switch 24, the CPU 106 reads out the credit amount C and the BET amount bet on each of the active pay lines L1 to L9 in the previous game stored in the predetermined memory areas of the aforementioned RAM 110. Then, the CPU 106 determines whether or not the aforementioned credit amount C is equal to or greater than the total bet amount bet in the previous game based upon the relation between the credit amount C and the BET amount thus read out. In the case that a determination has been made that the aforementioned credit amount C is less than the total bet amount bet on the previous game (in the case of "NO" in the determination processing in Step S12), the CPU 106 cannot start the game, and accordingly, the CPU 106 ends this routine without performing any processing. On the other hand, in the case that a determination has been made that the aforementioned credit amount C is equal to or greater than the total bet amount bet in the previous game (in the case of "YES" in the determination processing in Step S12), the CPU 106 subtracts the total bet amount bet in the previous game from the aforementioned credit amount C, and stores the subtracted value in a predetermined area of the RAM 110. Subsequently, the flow proceeds to Step S5 according to the instruction from the CPU 106.

In the following Step S5, the CPU 106 performs combination determination processing. A specific description will be given below regarding the combination determination processing.

In the aforementioned combination determination processing, first, the CPU 106 determines the combinations of the symbols along the aforementioned active pay lines when they are stationary. Specifically, the CPU 106 issues a command for the random number generator 112 to generate a random number, thereby extracting a random number in a predetermined range (in a range of "0" to "65535" in the present embodiment) generated by the random number generator 112. The CPU 106 stores the random number thus extracted in a predetermined memory area of the RAM 110. Note that a description is being given in the present embodiment regarding an arrangement in which the random number is generated by the random number generator 112, which is a separate component from the aforementioned CPU 106. Also, an arrangement may be made in which the random number is generated by computation processing by the CPU 106 without involving the random number generator 112. The CPU 106 reads out a basic game random number table (see FIG. 14), and a particular combination table (not shown) for providing an award, each of which is stored in the ROM 108. Then, the CPU 106 stores the basic game random number table and the particular combination table thus read out in a predetermined memory area of the RAM 110. With such an arrangement, the CPU 106 stores the basic game random number table and the particular combination table in the predetermined memory area in the form including the range of the random numbers for each pattern and the corresponding probability defined in the basic game switching probability determining table shown in FIG. 15. Note that the CPU 106 controls the display of the symbols when they are stationary for each reel based upon the aforementioned basic game random table. Furthermore, the CPU 106 reads out the basic game random number table and the particular combination table for providing an award stored in the predetermined area of the aforementioned RAM 110. Then, the CPU 106 determines the combination of the symbols when they are stationary with respect to the aforementioned active pay lines with reference to the aforementioned basic game random number table, using the random number stored in the predetermined memory region of the aforementioned RAM 110 as a parameter. Upon determination of particular combinations for providing an award, the CPU 106 stores the particular combination data for providing an award thus determined in a predetermined memory area of the RAM 110. Then, the CPU 106 reads out the random number and the particular combination data for providing an award stored in the predetermined memory area of the RAM 110, and determines the combination of the symbols to be displayed when they are stationary based upon the random number and the particular combination data for providing an award thus read out. In this stage, a symbol disposition table (not shown) stored in the ROM 108 is read out by the CPU 106. The symbol disposition table thus read out is stored in a predetermined memory area of the RAM 110, and used as reference data. The CPU 106 stores the data for the stationary symbols thus determined in a predetermined memory area of the RAM 110. Alternatively, an arrangement may be made in which the symbols when they are stationary are determined for each reel using the aforementioned basic game random number table.

Upon determination of the combination of the symbols when they are stationary with respect to the aforementioned active pay lines, the CPU 106 determines whether or not the combination of the symbols when they are stationary with respect to the active pay lines matches any one of the particular combinations for providing an award. In the case that the combination of the symbols when they are stationary with respect to the active pay lines matches any one of the particular combinations for providing an award, the CPU 106 activates a flag, which indicates that the player has won the award that corresponds to the kind of particular combination for providing an award, in order to provide the award that accords with the particular combination of symbols with respect to the active pay lines for providing the award. The activated flag, which indicates the player has won an award, is stored in a predetermined area of the RAM 110 according to the instruction from the CPU 106. On the other hand, in the case that the combination of the symbols when they are stationary with respect to the active pay lines matches any one of the other combinations, i.e., the losing combinations, the CPU 106 does not activate the flag which indicates that the player has won an award. Subsequently, the flow proceeds to Step S6 according to the instruction from the CPU 106.

In the following Step S6, the CPU 106 instructs the mechanical reels 3A through 3E to start to rotate. Specifically, the CPU 106 instructs the mechanical reels 3A through 3E, in order or at the same time, based upon the symbol disposition table stored in the aforementioned RAM 110. Let us consider an arrangement in which the slot machine 13A employs video reels. With such an arrangement, the CPU 106 displays an image of the five video reels starting to rotate.

On the other hand, let us consider an arrangement in which the slot machine 13A employs mechanical reels. With such an arrangement, after the mechanical reels 3A through 3E have started to rotate according to the instruction from the CPU 106, the CPU 106 counts the number of driving pulses transmitted to each of the stepping motors 45A through 45E, and the counted numbers are stored in a predetermined memory area of the RAM 110. Furthermore, a reset pulse is acquired upon each rotation of each of the mechanical reels 3A through 3E. The reset pulses of the mechanical reels 3A through 3E are input to the CPU 106 via the reel position detecting circuit 46. Each driving pulse counted value stored in the aforementioned RAM 110 is cleared to "0" according to the corresponding reset pulse thus acquired. With such an arrangement, the counted value, which corresponds to the rotational position in a range of one cycle of the reel, is stored in a predetermined memory area of the RAM 110 for each of the mechanical reels 3A through 3E. In the symbol disposition table stored in the aforementioned RAM 110, the rotational positions of the mechanical reels 3A through 3E and the symbols on the mechanical reels 3A through 3E are stored in association with one another. Before the CPU 106 refers to the symbol disposition table, the CPU 106 makes a combination of the code number assigned to each of the mechanical reels 3A through 3E, in increments of predetermined rotational pitches of the reels, and the symbol code that indicates the symbol assigned to each code number, with the particular rotational position at which the aforementioned reset pulse has been generated as the reference position.

Upon the mechanical reels 3A through 3E starting to rotate, the CPU 106 waits for a predetermined period of time to elapse (Step S7). After the predetermined period of time has elapsed (in the case of "YES" in the determination processing in Step S7), the CPU 106 instructs the mechanical reels 3A through 3E to automatically stop rotating (Step S8). Specifically, the CPU 106 instructs the mechanical reels 3A through 3E to stop rotating in order or at the same time such that the symbols when they are stationary, which correspond to the particular combinations for providing an award determined in the aforementioned Step S5, are displayed within a display region that has a visually interactive relationship with the player. Subsequently, the flow proceeds to Step S9 according to the instruction from the CPU 106. On the other hand, let us consider an arrangement in which the slot machine 13A employs video reels. With such an arrangement, the CPU 106 waits for a predetermined period of time to elapse (Step S7). Then, after the predetermined period of time has elapsed (in the case of "YES" in the determination processing in Step S7), the CPU 106 displays an image of the five video reels stopping to rotate (Step S8).

In the following Step S9, the CPU 106 determines whether or not a predetermined symbol combination has been formed based upon the results of the combination determination processing performed in Step S5. Specifically, the CPU 106 makes this determination based upon the state of the flag that indicates whether or not the player has won an award with respect to the active pay lines stored in the predetermined memory area of the aforementioned RAM 110. In the case that the flag, which indicates that the player has won an award, has not been activated, i.e., in the case that the symbol combination matches any one of the "other" combinations, which are combinations other than the particular combinations for providing an award (in the case of "NO" in the determination processing in Step S9), the CPU 106 determines that the particular combination for providing an award has not been formed, and ends this routine. On the other hand, in the case that the flag, which indicates that the player has won an award, has been activated, i.e., in the case that the symbol combination matches any one of the combinations other than the "other" combinations (in the case of "YES" in the determination processing in Step S9), the flow proceeds to Step 10 according to the instruction from the CPU 106.

In the following Step S10, the CPU 106 determines whether or not the particular combination for providing an award is "BONUS". The term "BONUS" as used here represents a symbol combination in which "BONUS" designs are arranged along the active pay line. A specific description will be given later with reference to FIG. 22. In the present embodiment, in the case that the "BONUS" combination has been formed, the second game starts. The CPU 106 makes this determination based upon the particular combination data for providing an award stored in the predetermined memory area of the aforementioned RAM 110. In the case that the particular combination data for providing an award does not match the "BONUS" combination (in the case of "NO" in the determination processing in Step S10), the CPU 106 determines that the "BONUS" combination has not been formed with respect to the particular combination data for providing an award, and the flow proceeds to step S13 according to the instruction from the CPU 106. On the other hand, in the case that the particular combination data for providing an award matches the "BONUS" combination (in the case of "YES" in the determination processing in Step S10), the CPU 106 determines that the "BONUS" combination has been formed with respect to the particular combination data for providing an award, and the flow proceeds to step S11 according to the instruction from the CPU 106.

In the following Step S11, the CPU 106 performs second game processing described later with reference to FIGS. 20A through 20D. Specifically, the CPU 106 transmits a second game start signal to the central controller 14. After the second game processing, the CPU 106 ends this routine.

On the other hand, in the case that the flow has proceeded to Step S13, the CPU 106 pays out an amount of coins corresponding to the aforementioned particular combination for providing an award. Specifically, the CPU 106 calculates the amount of coins to be paid out for the aforementioned particular combination for providing an award, with reference to the basic game payout table. The CPU 106 reads out the credit amount stored in the aforementioned predetermined memory area of the RAM 110. Then, the CPU 106 calculates the sum total amount of coins to be paid out thus calculated and the credit amount thus read out, and stores the sum thus calculated in a predetermined memory area of the RAM 110. The CPU 106 displays the aforementioned value thus stored on the credit amount display unit 49. Subsequently, the CPU 106 ends this routine.

FIGS. 20A through 20D are flowcharts which show the processing and operation in the second game performed by the gaming system 10. A description will be given regarding a second game processing program for the slot machine 13A executed by the CPU 106 of the slot machine 13A, and a second game processing program for the central controller 14 executed by the CPU 206 of the central controller 14, in that order, with reference to FIGS. 20A through 20D. Note that each of the programs shown in the flowcharts in FIGS. 20A through 20D are stored in the ROM 108 and the RAM 110 included in the slot machine 13A, and the ROM 208 and the RAM 210 included in the central controller 14. Also, these programs are executed by the CPU 106 included in the slot machine 13A, and the CPU 206 included in the central controller 14. Note that each of the other slot machines 13B, . . . , and 13H operates in the same way.

First, a description will be given regarding the second game processing program for the slot machine 13A with reference to FIGS. 20A through 20D. In Step S101 shown in FIG. 20A, the CPU 106 transmits a second game start signal to the central controller 14. Subsequently, the flow proceeds to Step S102 according to the instruction from the CPU 106. Here, the second game start signal includes at least: the data which allows the slot machine 13A to be identified; the credit amount bet on the "BONUS" combination being formed in the basic game; and the information with respect to the active pay lines.

In Step S102, the CPU 106 displays the BET screen 70 on the liquid crystal display 30A of the slot machine 13A, as described later with reference to FIG. 24 (Step S102). Subsequently, the CPU 106 starts the period for receiving bets, during which the players can bet chips (Step S103). In this stage, using his/her chips, each player can place a bet on the BET area 73 that accords with a desired number according to his/her prediction by operating the touch panel 32 during the betting period, in which players are allowed to place bets. Note that a specific description will be given later regarding the betting method using the BET screen 70 with reference to FIG. 24.

Subsequently, upon reception of a betting period end signal, which indicates that the betting period has ended, from the CPU 206 of the central controller 14 (Step S104 in FIG. 20B), the CPU 106 displays an image, which provides notice that the betting period has ended, on the liquid crystal display 30A of the slot machine 13A, and the placement of bets via the touch panel 32 ends (Step S105). Subsequently, the flow proceeds to Step S106 shown in FIG. 20C according to the instruction from the CPU 106.

Figure 20A:
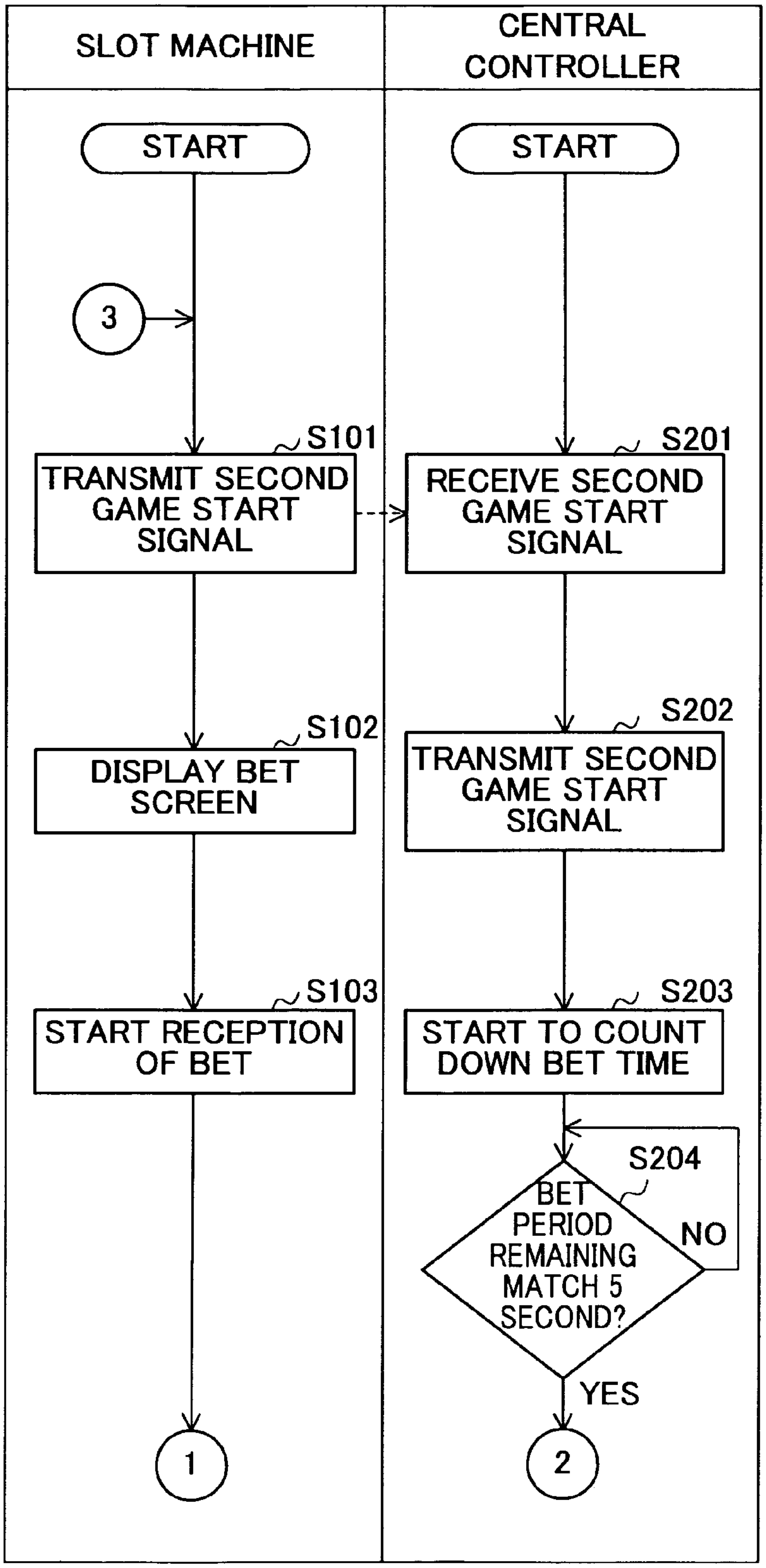
FIGS. 20A through 20D are flowcharts which show the processing and operation of the gaming system in the second game according to the embodiment of the present invention.
Figure 20B:
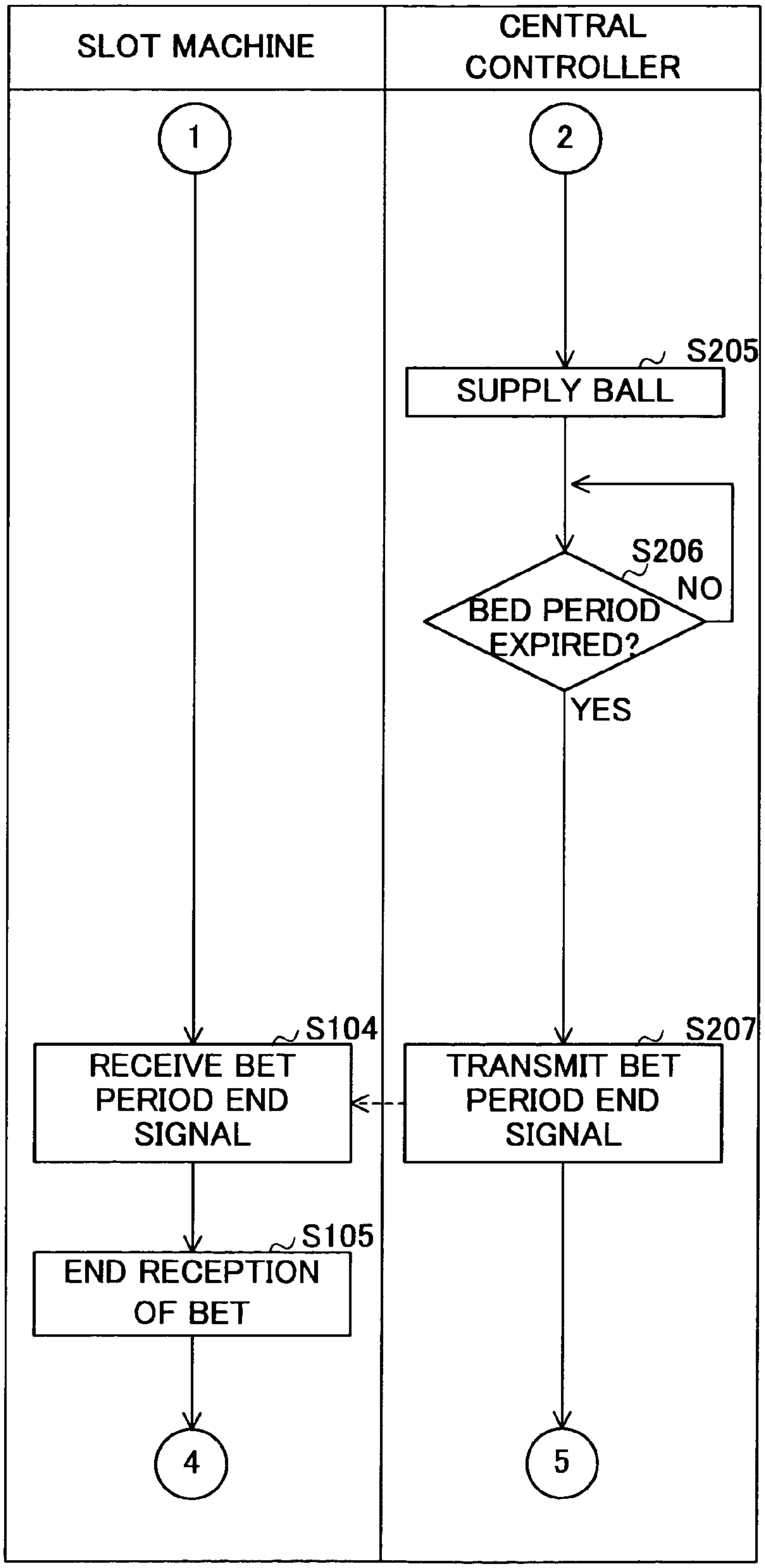
Figure 20C:
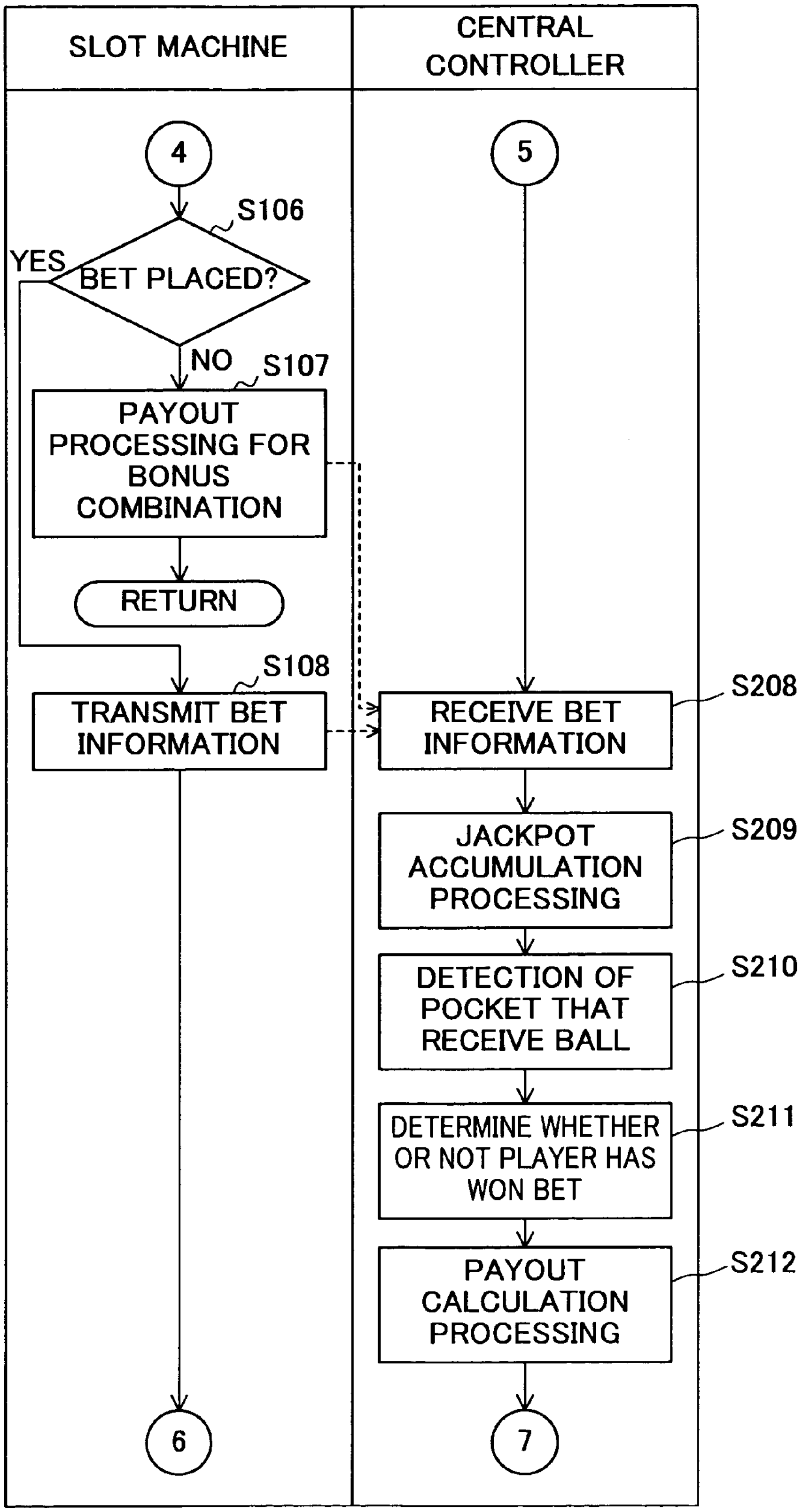

In Step S106 shown in FIG. 20C, the CPU 106 determines whether or not the player has placed bets during the betting period. In the case that bets have been placed (in the case of "YES" in the determination processing in Step S106), the flow proceeds to Step S108 according to the instruction from the CPU 106. On the other hand, in the case that bets have not been placed (in the case of "NO" in the determination processing in Step S106), the flow proceeds to Step S107 according to the instruction from the CPU 106.

In Step S107, the CPU 106 performs payout processing corresponding to the "BONUS" combination, and transmits a bet information signal, which provides notice that bets have not been placed, to the central controller 14. Specifically, the CPU 106 calculates the amount of coins to be paid out based upon the basic game payout table (see FIG. 16). The CPU 106 reads out the credit amount stored in the predetermined memory area of the RAM 110, calculates the sum total of the credit amount thus read out and the amount of payout thus calculated, and stores the sum thus calculated in the predetermined memory area of the RAM 110. Also, the CPU 106 displays the sum thus stored on the credit amount display unit 49. Subsequently, this routine ends according to the instruction from the CPU 106.

Note that an arrangement may be made in which, in the case that the conditions for playing the roulette game have been satisfied, but the player has abandoned the right to play the roulette game, the credit is not paid out.

On the other hand, in Step S108, the CPU 106 transmits bet information (the BET area 73 specified by the player and the amount of chips (bet amount) bet on the BET area 73 thus specified) specified by the player via the slot machine 13A.

Subsequently, the CPU 106 receives the credit payout results transmitted from the CPU 206 of the central controller 14 (Step S109 in FIG. 20D). Note that the credit payout results match the payout results according to whether the player has won or lost the roulette game performed using the BET screen 70. Subsequently, the flow proceeds to Step S110 according to the instruction from the CPU 106.

In Step S110, the CPU 106 pays out the credit based upon the payout results received in Step S109. Specifically, the credit data for the amount of credit corresponding to the payout for the roulette game is stored in the RAM 110. Subsequently, the flow proceeds to Step S111 according to the instruction from the CPU 106.

In Step S111, the CPU 106 determines whether or not the second game is to be ended. Specifically, in the case that there is any credit remaining in the roulette game, a screen is displayed, which allows the player to make selections, for example, thereby allowing the CPU 106 to make determination. On the other hand, in the case that there is no credit remaining in the roulette game, the CPU 106 ends the second game without providing the player with a selection opportunity. Here, in the case that there is no credit remaining in the roulette game, or in the case that the player has selected the option to end the roulette game (in the case of "YES" in the determination processing in Step S111), the flow proceeds to Step S112 according to the instruction from the CPU 106. On the other hand, in the case that there is a credit amount remaining in the roulette game, and the player has selected the option to continue the roulette game (in the case of "NO" in the determination processing in Step S111), the flow proceeds to Step S101 shown in FIG. 20A according to the instruction from the CPU 106. Then, the CPU 106 transmits a second game start signal again to the central controller 14. This starts the betting period, and the next game starts.

In Step S112, the CPU 106 transmits a second game end signal to the central controller 14. In the case that there is any credit remaining in the roulette game, the CPU 106 reads out the credit amount which is used in the basic game, and which is stored in the predetermined memory area. Then, the CPU 106 calculates the sum total of the credit amount thus read out and the credit data corresponding to the payout for the roulette game stored in the RAM 110. Then, the CPU 106 stores the sum thus calculated in the predetermined memory area of the RAM 110. Also, the CPU 106 displays the sum thus calculated on the credit amount display unit 49 of the slot machine 13A. Subsequently, the CPU 106 ends this routine. In the case that the second game ends according to the instruction from the slot machine 13A, the roulette game ends.

As described above, in the case that the player has won the payout in the roulette game, the credit that has increased by the amount of the payout is added to the coins for the slot machine 13A. Such an arrangement allows the player to use the payout from the roulette game in the form of coins. This provides a closer relation between the basic game and the second game, thereby improving the amusement value of the game provided by the overall gaming system 10.

Next, a description will be given regarding the second game processing program for the central controller 14 with reference to FIGS. 20A through 20D.

In Step S201 shown in FIG. 20A, the CPU 206 receives a second game start signal transmitted in the aforementioned Step S101 from the CPU 106 of the slot machine 13A. Upon reception of the second game start signal, the CPU 206 stores the second game start signal thus received in the RAM 210. Furthermore, the CPU 206 raises the movable floor 18 on which the slot machine 13A that has transmitted the second game start signal and the seat 57 have been installed. Furthermore, the CPU 206 displays an image on the large-size monitor 16 which provides a notification of the start of the second game. With such an arrangement, the movable floor 18 on which the slot machine 13A has been installed is raised, and a second game start message is displayed on the large-size monitor 16. This notifies other persons in the amusement facility of the start of the second game, in addition to the players at the other slot machines 13B, . . . , and 13H. Subsequently, the flow proceeds to Step S202 according to the instruction from the CPU 206.

In Step S202, the CPU 206 transmits a second game start signal to the other slot machines 13B, . . . , and 13H and the second gaming terminals 15. With the present embodiment, the CPU 206 transmits a second game start signal to the other slot machines 13B, . . . , and 13H and the second gaming terminals 15, which allows the player to participate in the roulette game using any one of the other slot machines 13B, . . . , and 13H and the second gaming terminals 15. Note that the principal operation of each of the other slot machines 13B, . . . , and 13H and the second gaming terminals 15 is the same as that of the slot machine 13A, and accordingly, descriptions thereof will be omitted. Subsequently, the flow proceeds to Step S203 according to the instruction from the CPU 206.

In Step S203, the CPU 206 starts to count down the betting period, during which the player can place bets, from the point in time at which the second game start signal has been transmitted by the slot machine 13A. In the betting period, the players at the slot machines 13A that participate in the game can place bets with their own chips on the BET area 73 that corresponds to a desired number according to their prediction by operating the touch panel 32 of the liquid crystal display 30.

Also, an arrangement may be made in which, after the player has decided how to place his/her bets via the liquid crystal displays 30A of the slot machine 13A, the CPU 206 receives the data including the information with respect to the position on which the player has placed bets and the amount of chips bet, and displays the information on the monitor 16. With such an arrangement, the monitor 16 displays the information with respect to the bets placed by each player. Such an arrangement allows each player to place bets after the player has confirmed the bets placed by other players, i.e., giving consideration to the results thus displayed on the monitor 16. This allows the player to include the bets placed by other players in his/her game strategy, thereby improving the amusement value of the game. Subsequently, the flow proceeds to Step S204 according to the instruction from the CPU 206.

In Step S204, the CPU 206 determines whether or not the time remaining in the betting period has become 5 seconds. Note that the time remaining in the betting period is also displayed on the BET time display unit 74 provided to the BET screen 70 of the second gaming device 11 (see FIG. 12). In the case that a determination has been made that the time remaining in the betting period has not reached 5 seconds (in the case of "NO" in the determination processing in step S204), the CPU 206 repeatedly performs the processing in step S204 in order to wait for the time remaining in the betting period to become 5 seconds. On the other hand, in the case that a determination has been made that the time remaining in the betting period has become 5 seconds (in the case of "YES" in the determination processing in step S204), the flow proceeds to Step S205 shown in FIG. 20B according to the instruction from the CPU 206.

In Step S205 shown in FIG. 20B, the CPU 206 supplies the ball 65 to the inner portion of the roulette board. Specifically, first, the CPU 206 drives the ball supply device so as to supply the ball 65 to the inner portion of the roulette board, whereby the roulette device 60 performs the number determination processing according to the game execution program. More specifically, after the ball 65 is supplied, the CPU 206 further drives the driving motor such that the wheel 62 rotates at a predetermined rotational speed in the direction opposite to the ball supply direction. The ball 65 thus supplied rolls onto the roulette board along the guide wall 66. Subsequently, as the ball 65 loses its centrifugal force due to reduction in its rotational speed, the ball 65 rolls down along the slope of the frame 61, whereupon the ball 65 reaches the rotating wheel 62 (see FIG. 12).

Then, the ball 65 rolling down to the rotating wheel 62 is received by any one among the number pockets 63 through the number display plate 64 provided to outer perimeter of the wheel 62, which is still rotating. As a result, the number marked on the number display plate 64 that corresponds to the number pocket 63 retaining the ball 65 (any one of the numbers "0", "00", and "1" to "36" shown in FIG. 12) is determined to be the winning number.

Furthermore, upon the supply of the ball 65 to the inner portion of the roulette board, the CPU 206 instructs the movable viewpoint cameras 17 to capture images of the roulette device 60, and displays the images thus captured on the monitor 16. Such an arrangement allows the players to visually confirm the stage in which the winning number is determined in the roulette game by viewing the monitor without the need to monitor the second gaming device 11. Note that an arrangement may be made in which the screen displayed on the monitor 16 is divided into multiple parts as necessary, and both the roulette device 60 and the BET screen 70 are displayed on the monitor 16.

Subsequently, the CPU 206 determines whether or not the betting period has expired (in Step S206). In the case that determination has been made that the betting period has not expired (in the case of "NO" in the determination processing in step S206), the CPU 206 repeatedly performs the processing in Step S206 in order to wait for the betting period to expire. On the other hand, in the case that a determination has been made that the betting period has expired (in the case of "YES" in the determination processing in step S206), the CPU 206 transmits a betting period end signal, which provides notice that the betting period has expired, to the CPU 106 of the slot machine 13A (Step S207). Note that the CPU 206 transmits the bet period end signal to the other slot machines 13B, . . . , and 13H and the second gaming terminals 15 in the same way.

Subsequently, the CPU 206 receives the bet information (information with respect to whether or not the player has placed bets, the BET area 73 specified by the player in the case that the player has placed bets, the amount of chips bet on the BET area 73 thus specified (bet amount), and the betting method) specified by the player via the slot machines 13A. Then, after the CPU 206 checks whether or not the bet information thus received satisfies the conditions specified in the second game payout table stored in the ROM 208, the CPU 206 stores the bet information thus received in the bet information storage area of the RAM 210 (Step S208 in FIG. 20C). The CPU 206 may display the bet information thus stored in the bet information storage area of the RAM 210 on the monitor 16. Note that, in the case of reception of the information that the player has not placed bets, the CPU 206 lowers the movable floor 18 on which the slot machine 13A and the seat have been installed. Subsequently, the flow proceeds to Step S209 according to the instruction from the CPU 206. Note that the CPU 206 also receives the bet information from the other slot machines 13B, . . . , and 13H and the second gaming terminals 15 in the same way.

In Step S209, the CPU 206 adds 0.5% of the total credit that has been bet via the slot machines 13A, and which has been received in step S208, to the amount of jackpot stored in the jackpot accumulation storage area of the RAM 210, thereby updating the amount of accumulated jackpot. Then, the display of the JP display unit 75 is updated to reflect the accumulated jackpot. Note that in the case that the bet information received in Step S208 indicates that the player has not placed bets, this processing is not performed. Subsequently, the flow proceeds to Step S210 according to the instruction from the CPU 206.

In Step S210, the CPU 206 determines whether or not the ball 65 has been received by any one of the number pockets 63. Subsequently, the CPU 206 drives the win determination device in order to detect the number that accords with the number pocket 63 that has received the ball 65. Subsequently, the flow proceeds to Step S211 according to the instruction from the CPU 206.

In Step S211, the CPU 206 determines whether or not the player has won the game for the chips bet via the slot machines 13A, based upon the pocket number retaining the ball 65 which has been determined in the aforementioned Step S210, and the bet information with respect to the slot machines 13A received in the aforementioned Step S208. Subsequently, the flow proceeds to Step S212 according to the instruction from the CPU 206.

In Step S212, the CPU 206 executes payout calculation processing. In the payout calculation processing, the CPU 206 identifies the chips bet on the winning number. Then, the CPU 206 calculates the total credit payout to be paid out from the slot machines 13A using the payout rate (the amount of credit to be paid out for each chip (for each bet)) for each BET area 73 stored in the payout credit storage area of the ROM 208 and the weight determined by a corresponding pattern specified in the second game payout determining table. Subsequently, the flow proceeds to Step S213 shown in FIG. 20D according to the instruction from the CPU 206. In this case, the monitor 16 displays the information with respect to the winning number, the number of winning players, etc.

Figure 20D:
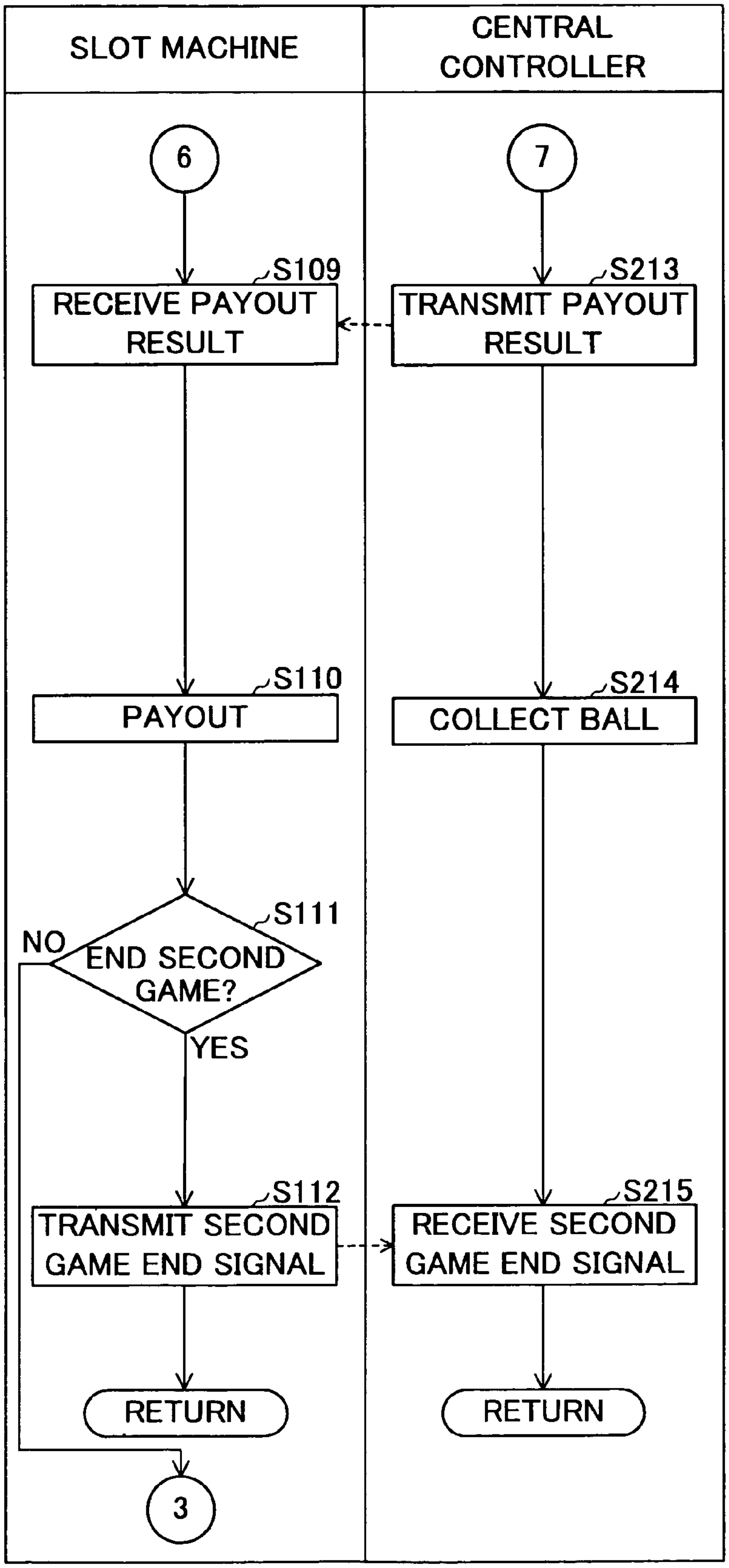

In step S213 shown in FIG. 20D, the CPU 206 executes transmission processing for the credit payout results of the roulette game according to the payout calculation processing in the aforementioned Step S213. Specifically, the CPU 206 outputs credit data corresponding to the payout amount to the winning slot machine 13A. Note that the CPU 206 also transmits the payout results to the other slot machines 13B, . . . , and 13H and the second gaming terminals 15 in the same way. Subsequently, the flow proceeds to Step S214 according to the instruction from the CPU 206.

In Step S214, the CPU 206 drives the ball collecting device provided below the wheel 62, thereby collecting the ball 65 remaining on the wheel 62. The ball 65 thus collected is supplied again to the wheel 62 of the roulette device 20 in the following games.

Subsequently, the CPU 206 receives a second game end signal transmitted from the slot machine 13A (Step S215). Upon reception of the second game end signal, the CPU 206 lowers the movable floor 18, on which the slot machine 13A and the seat 57 have been installed, whereupon this routine ends.

Note that an arrangement may be made in which, in the case that all the slot machines 13A, 13B, . . . , and 13H are performing only the basic game, i.e., in the case that none of the slot machines 13A, 13B, . . . , and 13H is performing the second game, the monitor 16 displays a demonstration image of the second game stored in the ROM 208.

Figure 21:
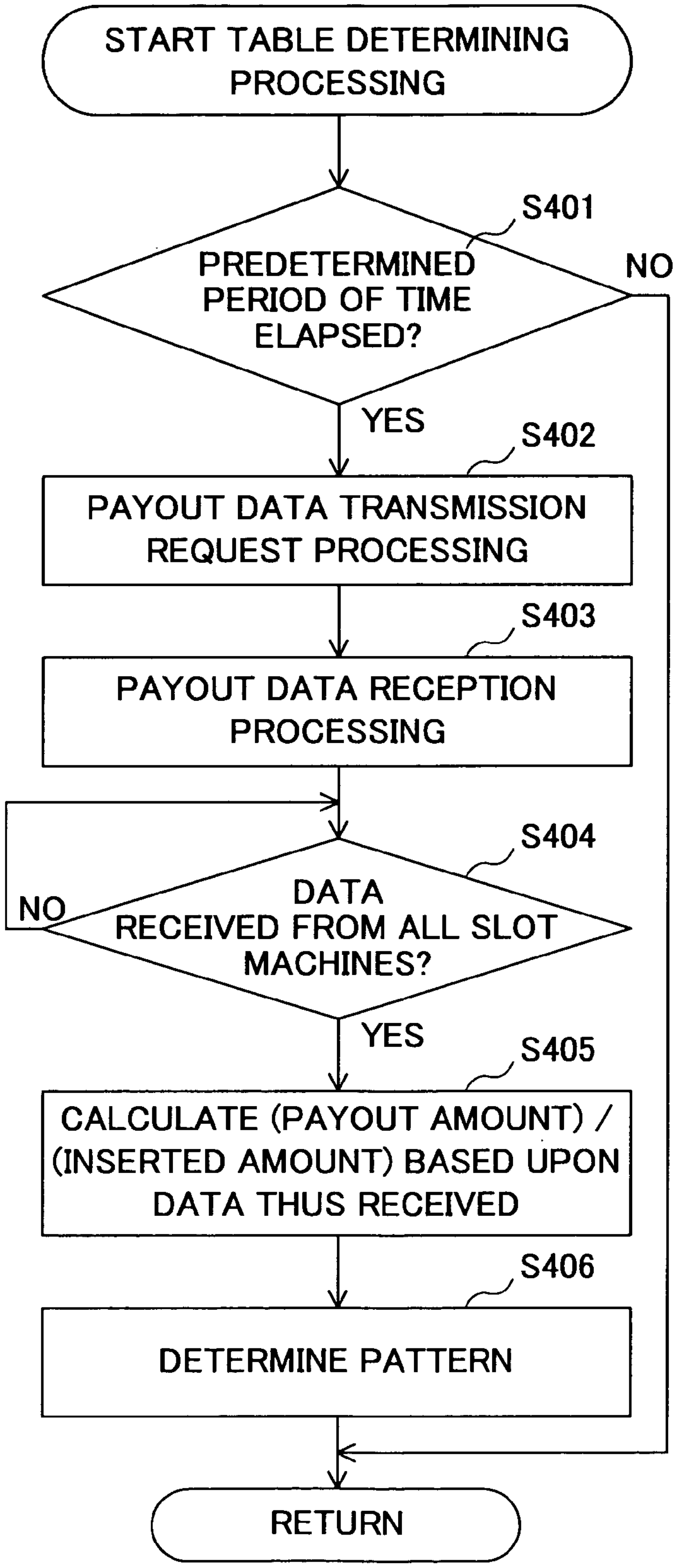
FIG. 21 is a flowchart which shows a flow of table determining processing and operation of the gaming system according to the embodiment of the present invention.

FIG. 21 is a flowchart which shows the flow of the table determining processing executed by the controller 200 of the central controller 14. Here, description will be made regarding the determining processing for the second game payout determining table shown in FIG. 18.

First, in Step S401, the CPU 206 determines whether or not a predetermined period of time has elapsed. The term "predetermined period of time" as used here represents an interval of time. For example, a 30 minute time interval is employed. In the case that the predetermined period of time has elapsed (in the case of "YES" in the determination processing in Step S401), the flow proceeds to Step S402 according to the instruction from the CPU 206. On the other hand, in the case that the predetermined period of time has not elapsed (in the case of "NO" in the determination processing in Step S401), the CPU 206 ends this processing.

In Step S402, the CPU 206 performs payout data transmission request processing. Specifically, for each of the slot machines 13A, 13B, . . . , and 13H, the CPU 206 requests transmission of the information with respect to the amount of coins paid out to and the amount of coins inserted by the player. Subsequently, the flow proceeds to Step S403 according to the instruction from the CPU 206.

In Step S403, the CPU 206 receives the payout data transmitted from each of the slot machines 13A, 13B, . . . , and 13H. Subsequently, the flow proceeds to Step S404 according to the instruction from the CPU 206.

In Step S404, the CPU 206 determines whether or not the CPU 206 has received the data from all the slot machines 13A, 13B, . . . , and 13H. In the case that the CPU 206 has received the data from all the slot machines 13A, 13B, . . . , and 13H (in the case of "YES" in the determination processing in Step S404), the flow proceeds to Step S405 according to the instruction from the CPU 206. On the other hand, in the case that the CPU 206 has not received the data from any one of the slot machines 13A, 13B, . . . , and 13H (in the case of "NO" in the determination processing in Step S404), the CPU 206 continues the processing in Step S404.

In Step S405, the CPU 206 calculates the value obtained by dividing the payment amount by the amount of inserted coins. Specifically, the CPU 206 calculates the sum total of the payment amount by calculating the sum of the payment amounts for all the slot machines 13A, 13B, . . . , and 13H. Furthermore, the CPU 206 calculates the sum total of the amount of inserted coins by calculating the sum of the amount of inserted coins for all the slot machines 13A, 13B, . . . , and 13H. Then, the CPU 206 divides the sum total of the payment amount by the sum total of the amount of inserted coins, thereby calculating the payout ratio. Subsequently, the flow proceeds to Step S406 according to the instruction from the CPU 206.

In Step S406, the CPU 206 determines the payout pattern. Specifically, the CPU 206 determines the payout pattern based upon which range of the "(payout amount)/(inserted amount)" values specified in the second game payout determining table shown in FIG. 18 includes the payout ratio thus calculated in Step S405. The payout pattern thus determined in Step S406 is stored in the RAM 210 of the controller 200, and is used for determining the payout in the second game. Subsequently, the CPU 206 ends this processing.

Note that a description has been given regarding an arrangement in which the payout pattern is determined for the second game payout determining table shown in FIG. 18. The present invention is not restricted to such an arrangement. Also, determining processing may be performed for the basic game switching probability determining table in the same way. Specifically, with such an arrangement, a payout pattern is determined based upon which range of the "(payout amount)/(inserted amount)" values specified in the basic game switching probability determining table shown in FIG. 15 includes the payout ratio thus calculated in Step S405. The payout pattern thus determined in Step S406 is transmitted from the CPU 206 of the controller 200 to each of the slot machines 13A, 13B, . . . , and 13H, thereby updating each basic game random number table. Each basic game random number table is used for determining the combination in the basic game. This processing enables the amount of credits to be kept within a predetermined range for the overall gaming system.

A description has been made regarding an arrangement in which the weighting factor for calculating the weighted payout is calculated using the value of the total of all the slot machines 13A, 13B, . . . , and 13H. Also, an arrangement may be made in which the "(payout amount)/(inserted amount)" value is calculated for the slot machine 13A, and the payout paid out at the slot machine 13A is determined based upon the "(payout amount)/(inserted amount)" value thus calculated. With such an arrangement, the credit is paid out in an averaged manner for each of the slot machines 13A, 13B, . . . , and 13H.

Figure 22:
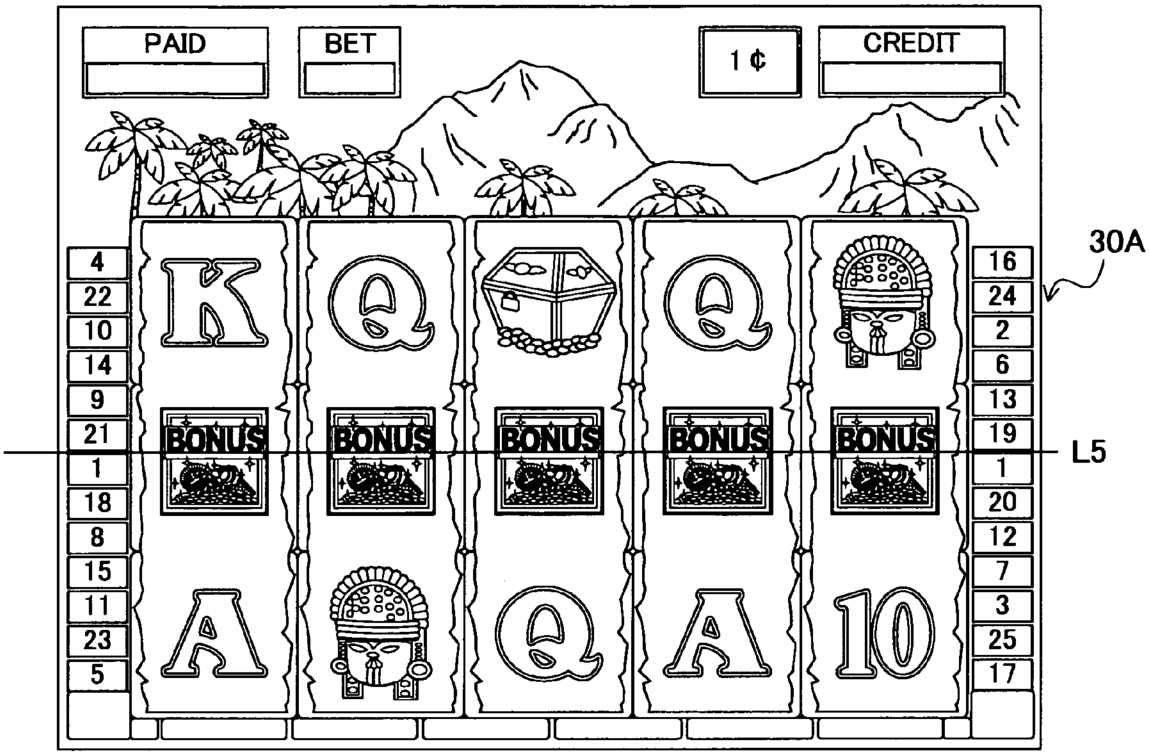
FIG. 22 shows an example of what is displayed when a combination of "BONUS" symbols has come to a stop along an active pay line L5 on a display region in the basic game executed by the slot machine according to the embodiment of the present invention.
Figure 23:
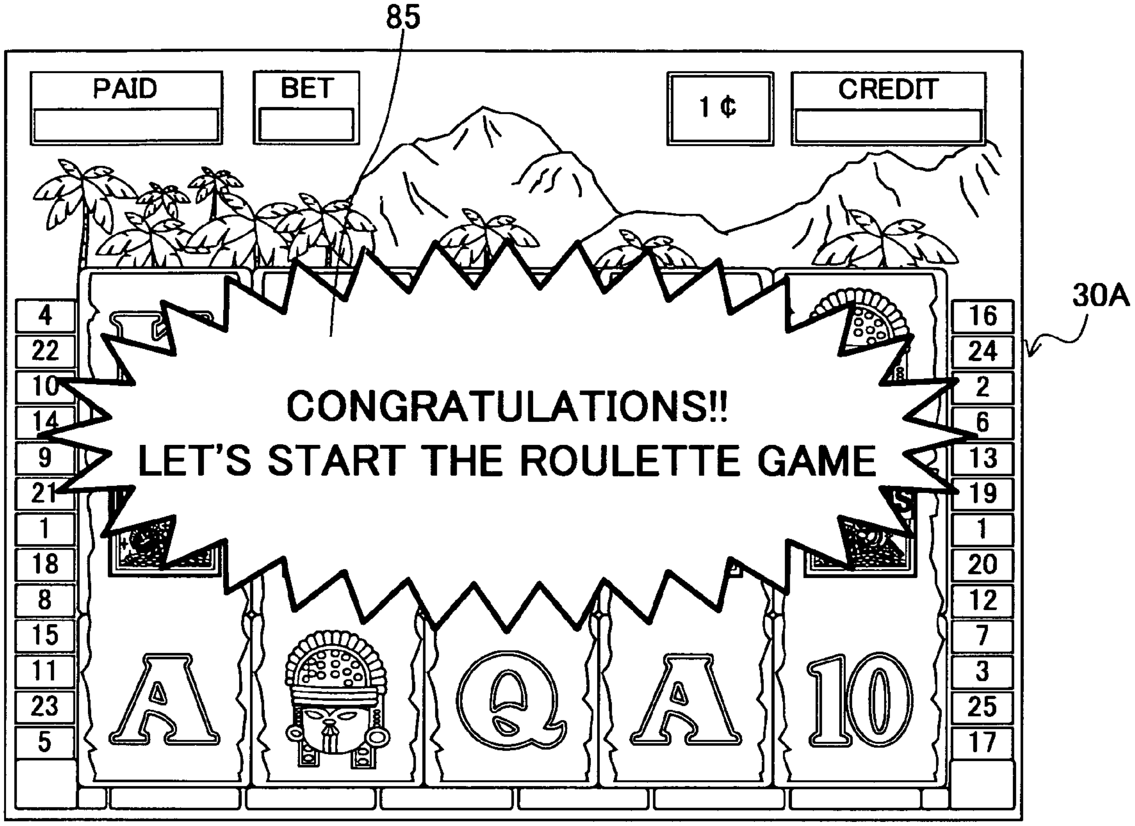
FIG. 23 shows an example of what is displayed after the symbol combination shown in FIG. 21 has been displayed in the basic game executed by the slot machine according to the embodiment of the present invention.

FIGS. 22 and 23 show examples of what is displayed on the slot machine 13A for the basic game according to the present embodiment of the present invention. As shown in FIG. 22, the symbols when they are stationary are displayed on the liquid crystal display 30A of the slot machine 13A. In this example, the "BONUS" symbols are arranged along the horizontal line on the middle portion, i.e., the "BONUS" winning combination is formed along the active pay line L5. As described above, in the case that the "BONUS" winning combination has been formed, the game is switched to the second game. Accordingly, as shown in FIG. 23, the liquid crystal display 30A displays the small window 85 that displays a text reading "CONGRATULATIONS!! LET'S START THE ROULETTE GAME". Such visual effects notify the player that the "BONUS" symbols have been arranged along a particular active pay line, and that the roulette game will start soon.

Figure 24:
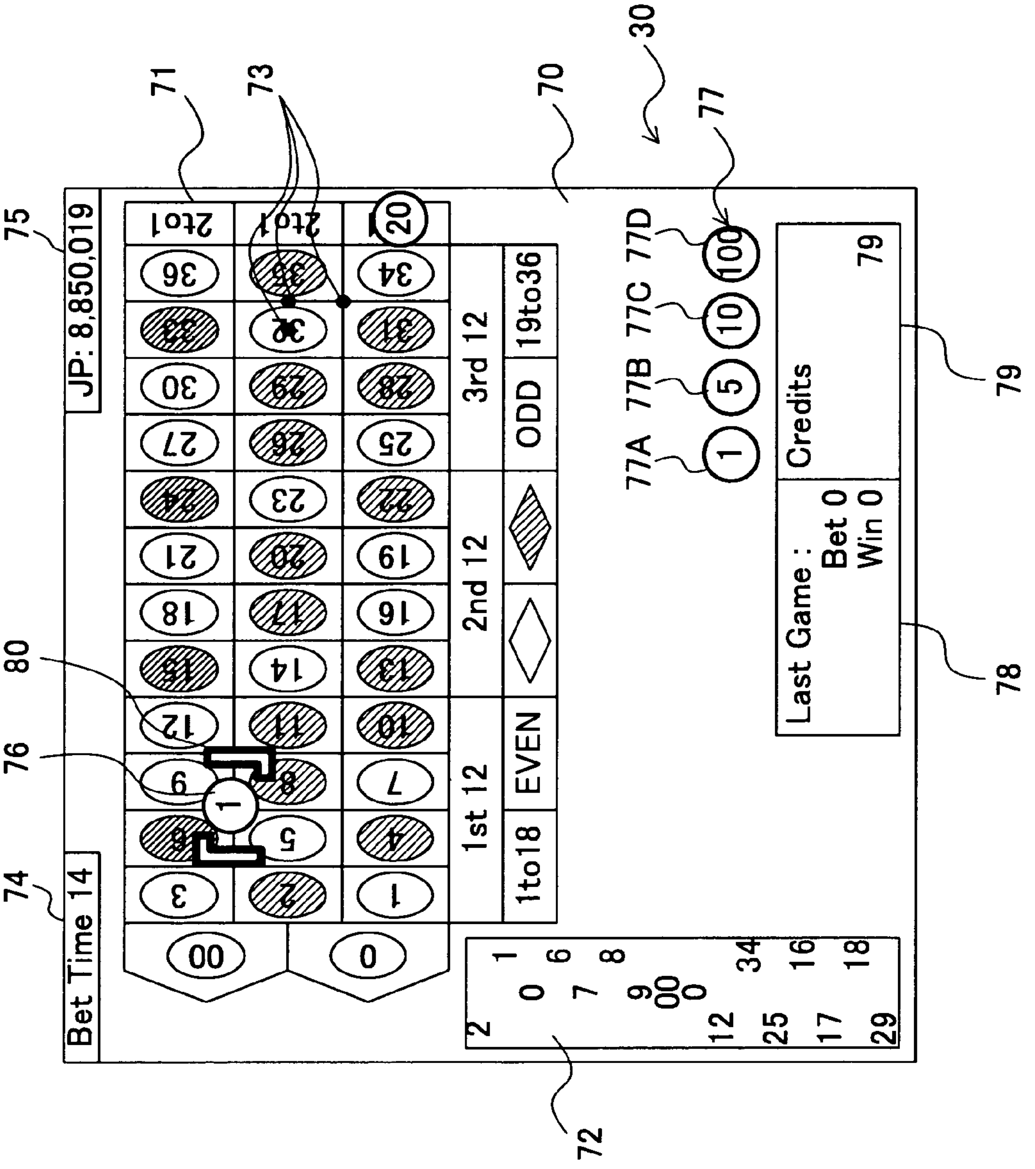
FIG. 24 shows an example of what is displayed on the slot machine and the second gaming terminal according to the embodiment of the present invention when the player places a bet in the second game.

FIG. 24 shows an example of what is displayed on the slot machine 13A during the roulette game. Specifically, FIG. 24 shows an example of what is displayed on the liquid crystal display 30A, which allows the player to place a bet on the roulette game. Note that the same can be said of the other slot machines 13B, . . . , and 13H. A description will be given below regarding the example of what is displayed for the second game with reference to FIG. 24, except for the same components described above with reference to FIG. 12.

First, the BET screen 70 is displayed on the liquid crystal display 30A of the slot machine 13A. The components of the BET screen 70 include: the result history display unit 72; the BET unit buttons 77; a payout display unit 78; and a credit amount display unit 79, which are displayed, in that order, starting from the upper left of the portion below the betting board 71, which is also displayed on the BET screen 70. The payout display unit 78 and the credit amount display unit 79 are dedicated components provided for the roulette game, instead of the payout display unit 48 and the credit amount display unit 49 provided to the slot machine 13A.

The BET unit buttons 77 are provided for allowing the player to place bets using chips on the BET area 73 (squares having a number or mark, or lines which define the squares) specified by the player. The BET unit buttons 77 comprise four kinds of buttons, i.e., a 1 BET button 77A, a 5 BET button 77B, a 10 BET button 77C, and a 100 BET button 77D.

With such an arrangement, first, the player specifies the desired BET area 73 on which bets are to be placed, with a cursor 80, which will be described later, by using his/her finger to directly push on the screen. In this stage, upon the player pushing the 1 BET button 77A, the chips are bet in increments of one chip (the amount of chips bet is incremented in the order of "1", "2", "3", . . . , for each time the player pushes the 1 BET button 77A with his/her finger or the like). Upon the player pushing the 5 BET button 77B, the chips are bet in increments of five chips (the amount of chips bet is incremented in the order of "5", "10", "15", . . . , for each time the player pushes the 5 BET button 77B with his/her finger or the like). Upon the player pushing the 10 BET button 77C, the chips are bet in increments of ten chips (the amount of chips bet is incremented in the order of "10", "20", "30", . . . , for each time the player pushes the 10 BET button 77C with his/her finger or the like). Upon the player pushing the 100 BET button 77D, the chips are bet in increments of one hundred chips (the amount of chips bet is incremented in the order of "100", "200", "300", . . . , for each time the player pushes the 100 BET button 77D with his/her finger or the like).

Such an arrangement simplifies the operation required for betting a great amount of chips. Note that one coin used in the basic game at the slot machine 13A corresponds to one chip used in the second game.

Note that the present invention is not restricted to an arrangement in which the chips are bet on only a single position. Also, an arrangement may be made which allows the player to place bets on multiple positions by specifying the BET area 73 again after the player has pushed the BET unit button.

Furthermore, the payout display unit 78 displays the amount of chips bet in the previous game and the payout credit amount. Here, the amount obtained by subtracting the amount of chips thus bet from the payout credit amount matches the credit amount newly obtained by the player in the previous game. This example of what is displayed shows the first instance of the second game after the game has been switched to the second game at the slot machine 13A. Accordingly, both the bet amount and the payout credit amount are set to "0".

Furthermore, the credit display unit 79 displays the credit amount deposited by the player at the current point in time. Upon the player betting chips, the credit amount is decremented corresponding to the amount of chips bet (1 bet corresponds to 1 credit). On the other hand, in the case that the player has won the chips bet, and accordingly, in the case that credit is paid out, the credit amount is incremented by the payout credit amount. Note that in the case that the credit amount possessed by the player has become zero, the game is over. This example of what is displayed shows the case in which the game has been switched to the second game with the credit amount "1" at the slot machine 13A. Furthermore, in this example of what is displayed, the player has bet "20" chips at "2 to 1" on the column "1", "4", "7", "10", . . . , and "1" chip on the four numbers "5", "6", "8", and "9". Accordingly, the credit amount display unit 79 displays the credit amount "79", which is obtained by subtracting "21 (=20+1)" from "100" which was the amount of chips immediately after the game had been switched to the second game.

Furthermore, the cursor 80, which indicates the BET area 73 currently selected by the player, is displayed on the betting board 71.

When the player places a bet via the BET screen 70 thus configured as described above, first, the player specifies the desired BET area 73 (squares having a number or mark, and lines defining the squares), on which chips are to be bet, by directly pushing the BET area 73 on the screen. As a result, the cursor 80 is moved to the BET area 73 thus specified.

Subsequently, upon pushing any one of the BET unit buttons 77 (1 BET button 77A, 5 BET button 77B, 10 BET button 77C, and 100 BET button 77D), the amount of chips that correspond to the BET unit buttons are bet on the BET area 73 thus specified. For example, upon pushing the 10 BET button 77C four times, pushing the 5 BET button 77B once, and pushing the 1 BET button 77A three times, a total of 48 chips are bet. The player can place a bet using such a function by operating the terminal at hand.

As described above, with the gaming system and the method of play, in the case that a predetermined combination of symbols such as "BONUS" symbols or the like has come to a stop along the active pay line L5 at the slot machine 13A, for example, in the basic game played at the slot machines 13A, 13B, . . . , and 13H, the roulette game starts, which is executed by the second gaming device 11 that is a separate device from the slot machine 13A. In this case, the slot machine 13A serves as a terminal which allows the player to place a bet on the roulette game. With such an arrangement, the player can use the credit obtained from the "BONUS" combination in the basic game as the credit in the roulette game. On the other hand, the payout from the roulette game is transmitted to the slot machine 13A, which allows the player to use the payout obtained in the roulette game as the credit in the basic game played at the slot machine 13A.

Furthermore, with the present embodiment, the central controller 14 receives the payout data, e.g., the data of the payout amount and the amount of the inserted coins for the slot machines 13A, 13B, . . . , and 13H, from the slot machines 13A, 13B, . . . , and 13H at a predetermined 30 minute time interval, for example. The central controller 14 determines the payout for the roulette game based upon the payout data, i.e., the data of the payout amount and the amount of the inserted coins thus received. Also, the central controller 14 may determine the probability of the game being switched to the second game for each of the slot machines 13A, 13B, . . . , and 13H based upon the payout data, in addition to the payout for the roulette game. A description has been made regarding an arrangement in which the data of the payout amount and the amount of inserted coins are employed as the payout data. The present invention is not restricted to such an arrangement. This enables the gaming system to be controlled in various manners. For example, this allows the payout to be kept within a predetermined range for the overall gaming system 10. Also, this allows the prevention of an excessive amount of credits being paid out only at a certain single slot machine, e.g., the slot machine 13A.

Also, the central controller 14 may determine the payout for the roulette game based upon the amount of credits which have been bet immediately before a predetermined condition has been satisfied for switching the game to the second game at the slot machine 13A, for example. With such an arrangement, the payout is determined according to the input from the player, thereby providing an abundant variety of payouts.

While the gaming system according to the present invention has been described above by way of embodiments, it should be clearly understood that the embodiments in no way restrict the present invention, and that the specific configurations such as the means and components may be modified and altered as suitable. Moreover, it should be understood that the advantages described in association with the embodiments are merely a listing of the most desirable advantages, and that the advantages of the present invention are by no means restricted to those described in connected with the embodiments.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A gaming system comprising:

a plurality of slot machines, each of which provides a basic game of a kind that differs from those provided by the other slot machines, and each of which has a function whereby, in a case that a predetermined condition has been satisfied, a signal is transmitted for switching the game to a second game;

a second gaming device which is a separate device from said plurality of slot machines, and which executes the second game; and a central controller which is communicably connected to said plurality of slot machines and said second gaming device, and has a function of receiving payout data for the basic game from said plurality of slot machines at a predetermined timing, and a function of determining a payout for the second game based upon the payout data, wherein, in a case that a predetermined condition has been satisfied for switching the game to the second game at any one of said slot machines, said central controller executes the second game using credit data provided from the basic game.

2. A gaming system according to claim 1, wherein said central controller determines the probability of the game being switched to the second game based upon the payout data, and transmits data including the probability thus determined to said plurality of slot machines.

3. A gaming system comprising:

a plurality of slot machines, each of which provides a basic game of a kind that differs from those provided by the other slot machines, and each of which has a function whereby, in a case that a predetermined condition has been satisfied, a signal is transmitted for switching the game to a second game;

a second gaming device which is a separate device from said plurality of slot machines, and which executes the second game; and a central controller which is communicably connected to said plurality of slot machines and said second gaming device, and has a function of receiving payout data for the basic game from said plurality of slot machines at a predetermined timing, and a function of determining a payout for the second game based upon the payout data, wherein said central controller determines a payout for the second game based upon the amount of credits that have been used in the basic game up to the point in time at which a predetermined condition is satisfied for switching the game to the second game.

4. A gaming system comprising:

a plurality of slot machines, each of which provides a basic game of a kind that differs from those provided by the other slot machines, and each of which has a function whereby, in a case that a predetermined condition has been satisfied, a signal is transmitted for switching the game to a second game;

a second gaming device which is a separate device from said plurality of slot machines, and which executes the second game; and a central controller which is communicably connected to said plurality of slot machines and said second gaming device, and has a function whereby, in a case that a predetermined condition has been satisfied for switching the game to the second game, the second game is executed using credit data provided from the basic game, a function of receiving payout data for the basic game from said plurality of slot machines at a predetermined timing, a function of determining a payout for the second game and the probability of the game being switched to the second game based upon the payout data, and a function of transmitting data including the probability thus determined to said plurality of slot machines.

5. A gaming system comprising:

a plurality of slot machines, each of which provides a basic game of a kind that differs from those provided by the other slot machines, and each of which has a function whereby, in a case that a predetermined condition has been satisfied, a signal is transmitted for switching the game to a second game;

a second gaming device which is a separate device from said plurality of slot machines, and which executes the second game; and a central controller which is communicably connected to said plurality of slot machines and said second gaming device, and has a function of receiving payout data for the basic game from said plurality of slot machines at a predetermined timing, a function of determining a payout for the second game and the probability of the game being switched to the second game based upon the payout data, a function of transmitting data including the probability thus determined to said plurality of slot machines, and a function of determining the payout for the second game based upon the amount of credits that have been used in the basic game up to the point in time at which the predetermined condition is satisfied.

6. A gaming system comprising:

a plurality of slot machines, each of which provides a basic game of a kind that differs from those provided by the other slot machines, and each of which has a function whereby, in a case that a predetermined condition has been satisfied, a signal is transmitted for switching the game to a second game;

a second gaming device which is a separate device from said plurality of slot machines, and which executes the second game; and a central controller which is communicably connected to said plurality of slot machines and said second gaming device, and has a function whereby, in a case that a predetermined condition has been satisfied for switching the game to the second game at any one of said slot machines, the second game is executed using credit data provided from the basic game, a function of receiving payout data for the basic game from said plurality of slot machines at a predetermined timing, a function of determining a payout for the second game based upon the payout data, and a function of determining the payout for the second game based upon the amount of credits that have been used in the basic game up to the point in time at which the predetermined condition is satisfied.

7. A gaming system comprising:

a plurality of slot machines, each of which provides a basic game of a kind that differs from those provided by the other slot machines, and each of which has a function whereby, in a case that a predetermined condition has been satisfied, a signal is transmitted for switching the game to a second game;

a second gaming device which is a separate device from said plurality of slot machines, and which executes the second game; and a central controller which is communicably connected to said plurality of slot machines and said second gaming device, and has a function whereby, in a case that a predetermined condition has been satisfied for switching the game to the second game at any one of said slot machines, the second game is executed using credit data provided from the basic game, a function of receiving payout data for the basic game from said plurality of slot machines at a predetermined timing, a function of determining a payout for the second game and the probability of the game being switched to the second game based upon the payout data, a function of transmitting data including the probability thus determined to said plurality of slot machines, and a function of determining the payout for the second game based upon the amount of credits that have been used in the basic game up to the point in time at which the predetermined condition is satisfied.

8. A gaming control method, which employs a system including a plurality of slot machines, each of which provides a basic game of a kind that differs from those provided by the other slot machines, and a second gaming device which is a separate device from said plurality of slot machines, said gaming control method comprising:

a step in which, in a case that a predetermined condition has been satisfied, a controller of one of said plurality of slot machines transmits a signal for switching the game to a second game executed by said second gaming device;

a step in which a central controller receives the signal for switching the game to the second game;

a step in which the controller of each of said plurality of slot machines transmits payout data for the basic game at a predetermined timing;

a step in which said central controller receives the payout data;

a step in which said central controller determines a payout for the second game based upon the payout data;

a step in which the controller of said one of said slot machines provides credit data;

a step in which the controller of said one of said slot machines transmits a signal for switching the game to the second game under a predetermined condition;

a step in which said central controller transmits a signal for switching the game to the second game;

a step in which the controller of said one of said slot machines transmits the credit data;

a step in which said central controller receives the credit data; and a step in which said central controller executes the second game using the credit data.

9. A gaming control method according to claim 8, further comprising:

a step in which said central controller determines the probability of the game being switched to the second game based upon the payout data; and a step in which said central controller transmits data including the probability thus determined to said plurality of slot machines.

10. A gaming control method, which employs a system including a plurality of slot machines, each of which provides a basic game of a kind that differs from those provided by the other slot machines, and a second gaming device which is a separate device from said plurality of slot machines, said gaming control method comprising:

a step in which, in a case that a predetermined condition has been satisfied, a controller of one of said plurality of slot machines transmits a signal for switching the game to a second game executed by said second gaming device;

a step in which a central controller receives the signal for switching the game to the second game;

a step in which the controller of each of said plurality of slot machines transmits payout data for the basic game at a predetermined timing;

a step in which said central controller receives the payout data;

a step in which said central controller determines a payout for the second game based upon the payout data, a step in which the controller of said one of said slot machines transmits a signal for switching the game to the second game under a predetermined condition;

a step in which said central controller receives the signal for switching the game to the second game;

a step in which the controller of said one of said slot machines transmits data of the amount of credits used in the basic game;

a step in which said central controller receives the data of the credit amount; and a step in which said central controller determines the payout for the second game based upon the credit amount.

11. A gaming control method, which employs a system including a plurality of slot machines, each of which provides a basic game of a kind that differs from those provided by the other slot machines, and a second gaming device which is a separate device from said plurality of slot machines, said gaming control method comprising:

a step in which a controller of one of said plurality of slot machines provides credit data;

a step in which, in a case that a predetermined condition has been satisfied, the controller of said one of said slot machines transmits a signal for switching the game to a second game executed by said second gaming device;

a step in which a central controller receives the signal for switching the game to the second game;

a step in which the controller of said one of said slot machines transmits the credit data;

a step in which said central controller receives the credit data;

a step in which said central controller executes the second game using the credit data;

a step in which the controller of each of said plurality of slot machines transmits payout data for the basic game at a predetermined timing;

a step in which said central controller receives the payout data;

a step in which said central controller determines a payout for the second game and the probability of the game being switched to the second game based upon the payout data; and a step in which said central controller transmits data including the probability thus determined to each of said plurality of slot machines.

12. A gaming control method, which employs a system including a plurality of slot machines, each of which provides a basic game of a kind that differs from those provided by the other slot machines, and a second gaming device which is a separate device from said plurality of slot machines, said gaming control method comprising:

a step in which, in a case that a predetermined condition has been satisfied, a controller of one of said plurality of slot machines transmits a signal for switching the game to a second game executed by said second gaming device;

a step in which a central controller receives the signal for switching the game to the second game;

a step in which the controller of said one of said slot machines transmits data of the amount of credits used in the basic game;

a step in which said central controller receives the data of the credit amount;

a step in which said central controller determines a payout for the second game based upon the credit amount;

a step in which the controller of each of said plurality of slot machines transmits payout data for the basic game at a predetermined timing;

a step in which said central controller receives the payout data;

a step in which said central controller determines the payout for the second game and the probability of the game being switched to the second game based upon the payout data; and a step in which said central controller transmits data including the probability thus determined to each of said plurality of slot machines.

13. A gaming control method, which employs a system including a plurality of slot machines, each of which provides a basic game of a kind that differs from those provided by the other slot machines, and a second gaming device which is a separate device from said plurality of slot machines, said gaming control method comprising:

a step in which a controller of one of said plurality of slot machines provides credit data;

a step in which, in a case that a predetermined condition has been satisfied, a controller of said one of said slot machines transmits a signal for switching the game to a second game executed by said second gaming device;

a step in which a central controller receives the signal for switching the game to the second game;

a step in which the controller of said one of said slot machines transmits the credit data;

a step in which said central controller receives the credit data;

a step in which said central controller executes the second game using the credit data;

a step in which the controller of said one of said slot machines transmits data of the amount of credits used in the basic game;

a step in which said central controller receives the data of the credit amount;

a step in which said central controller determines a payout for the second game based upon the credit amount;

a step in which the controller of each of said plurality of slot machines transmits payout data for the basic game at a predetermined timing;

a step in which said central controller receives the payout data; and a step in which said central controller determines the payout for the second game based upon the payout data.

14. A gaming control method, which employs a system including a plurality of slot machines, each of which provides a basic game of a kind that differs from those provided by the other slot machines, and a second gaming device which is a separate device from said plurality of slot machines, said gaming control method comprising:

a step in which a controller of one of said plurality of slot machines provides credit data;

a step in which, in a case that a predetermined condition has been satisfied, a controller of said one of said slot machines transmits a signal for switching the game to a second game executed by said second gaming device;

a step in which a central controller receives the signal for switching the game to the second game;

a step in which the controller of said one of said slot machines transmits the credit data;

a step in which said central controller receives the credit data;

a step in which said central controller executes the second game using the credit data;

a step in which the controller of said one of said slot machines transmits data of the amount of credits used in the basic game;

a step in which said central controller receives the data of the credit amount;

a step in which said central controller determines a payout for the second game based upon the credit amount;

a step in which the controller of each of said plurality of slot machines transmits payout data for the basic game at a predetermined timing;

a step in which said central controller receives the payout data;

a step in which said central controller determines the payout for the second game and the probability of the game being switched to the second game based upon the payout data; and a step in which said central controller transmits data including the probability thus determined to each of said plurality of slot machines.

* * * * *